United States Patent
Yanagisawa

(10) Patent No.: US 12,434,735 B2
(45) Date of Patent: Oct. 7, 2025

(54) VEHICLE MANAGEMENT DEVICE FOR MANAGING STATE OF VEHICLE AND VEHICLE MANAGEMENT METHOD FOR THE SAME

(71) Applicant: DENSO CORPORATION, Kariya (JP)

(72) Inventor: Kouichi Yanagisawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 302 days.

(21) Appl. No.: 18/163,774

(22) Filed: Feb. 2, 2023

(65) Prior Publication Data

US 2023/0182770 A1 Jun. 15, 2023

Related U.S. Application Data

(63) Continuation of application No. PCT/JP2021/026504, filed on Jul. 14, 2021.

(30) Foreign Application Priority Data

Aug. 6, 2020 (JP) ................................. 2020-133994
May 27, 2021 (JP) ................................. 2021-089555

(51) Int. Cl.
*B60W 60/00* (2020.01)
*B60W 10/18* (2012.01)
*B60W 10/20* (2006.01)
*B60W 50/02* (2012.01)
(Continued)

(52) U.S. Cl.
CPC .......... *B60W 60/001* (2020.02); *B60W 10/18* (2013.01); *B60W 10/20* (2013.01); *B60W 50/0205* (2013.01); *B60W 50/045* (2013.01); *B60W 2050/0075* (2013.01); *B60W 2552/10* (2020.02)

(58) Field of Classification Search
CPC .... B60W 60/001; B60W 10/18; B60W 10/20; B60W 50/0205; B60W 50/045; B60W 2552/10; B60W 2050/0075
See application file for complete search history.

(56) References Cited

U.S. PATENT DOCUMENTS 12,087,065 B2 * 9/2024 Matsunaga .......... G06V 20/588
2019/0176797 A1 6/2019 Okubo et al.
2019/0283239 A1 * 9/2019 Skaaksrud ......... G01C 21/3438
(Continued)

FOREIGN PATENT DOCUMENTS

CN 110503743 A 11/2019
JP 2001-034405 A 2/2001

*Primary Examiner* — Scott A Browne
*Assistant Examiner* — Terry C Buse
(74) *Attorney, Agent, or Firm* — Maschoff Brennan

(57) ABSTRACT

A state of a vehicle is managed, on which a driving system for providing acceleration, a braking system for providing deceleration, and a steering system for providing steering are mounted as a basic function system. It is determined whether the vehicle has a travelling anomaly estimated to be related to a characteristic change of the basic function system in a management target scene of travelling scenes of the vehicle in which a travelling direction changes when the vehicle travels in an autonomous driving mode. A replacement request component is designated and output, which is requested to be replaced according to a determined travelling anomaly from among a plurality of components constituting the basic function system.

19 Claims, 20 Drawing Sheets

(51) Int. Cl.
    *B60W 50/04*     (2006.01)
    *B60W 50/00*     (2006.01)

(56) References Cited

U.S. PATENT DOCUMENTS

| | | |
|---|---|---|
| 2019/0361449 A1 | 11/2019 | Ueno et al. |
| 2020/0225044 A1* | 7/2020 | Tohriyama .......... G01C 21/3848 |
| 2021/0171038 A1* | 6/2021 | Lee ................. B60W 30/18109 |
| 2022/0032929 A1* | 2/2022 | Wang ................ B60W 60/0015 |

* cited by examiner

VEHICLE MANAGEMENT DEVICE FOR MANAGING STATE OF VEHICLE AND VEHICLE MANAGEMENT METHOD FOR THE SAME

CROSS REFERENCE TO RELATED APPLICATIONS

The present application is a continuation application of International Patent Application No. PCT/JP2021/026504 filed on Jul. 14, 2021, which designated the U.S. and claims the benefit of priority from Japanese Patent Applications No. 2020-133994 filed on Aug. 6, 2020 and No. 2021-089555 filed on May 27, 2021. The entire disclosures of all of the above applications are incorporated herein by reference.

TECHNICAL FIELD

The present disclosure relates to a vehicle management device and a vehicle management method.

BACKGROUND

Conventionally, a first conceivable technique proposes a vehicle motion control technique for suppressing deterioration of the followability of a vehicle with respect to a target trajectory.

On the other hand, a second conceivable technique proposes a management system used to replace underbody components of a vehicle.

SUMMARY

According to an example, a state of a vehicle is managed, on which a driving system for providing acceleration, a braking system for providing deceleration, and a steering system for providing steering are mounted as a basic function system. It is determined whether the vehicle has a travelling anomaly estimated to be related to a characteristic change of the basic function system in a management target scene of travelling scenes of the vehicle in which a travelling direction changes when the vehicle travels in an autonomous driving mode. A replacement request component is designated and output, which is requested to be replaced according to a determined travelling anomaly from among a plurality of components constituting the basic function system.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
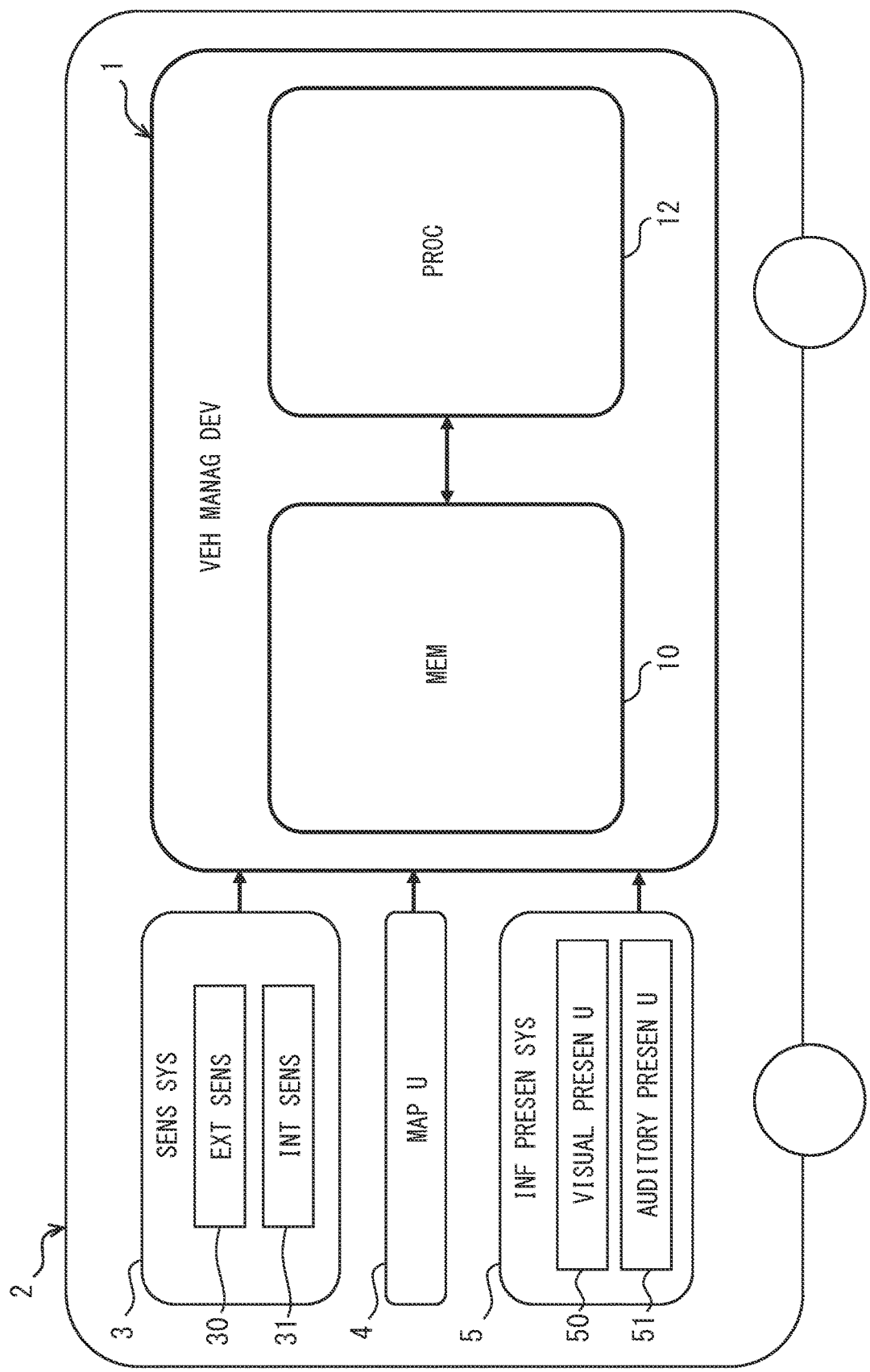
FIG. 1 is a block diagram showing the overall configuration of a vehicle management device according to a first embodiment.

Here, in the technique of controlling the vehicle in the autonomous driving mode to follow the target based on the actual traveling position as in the first conceivable technique, there may be a possibility that a difficulty may occur when the vehicle travels on a curve or turns left or right and the traveling direction of the vehicle changes. The difficulty is, for example, a risk that the vehicle would travel on the actual trajectory deviating from the target trajectory during the time for follow-up control such as the time to acquire the difference between the target trajectory and the actual trajectory, the time to estimate the actual traveling position, the time to reset the corrected trajectory, or the time to control the vehicle to follow the corrected trajectory. In addition, during the follow-up control period, a sudden change or hunting in the actual trajectory may be induced, which may deteriorate the riding comfort of the occupant.

Here, for example, in a driving environment in which it is necessary to avoid collisions with pedestrians, or in a driving environment in which traffic flow is greatly restricted, improvement of target followability is a particularly important issue. In addition, for example, in a driving environment where there are traffic participants who act while predicting the direction of motion of the vehicle, sudden changes or hunting in the actual trajectory caused by a decrease in target followability may lead to misunderstandings of vehicle motion prediction by traffic participants.

As a result of intensive research under such circumstances, the inventor has found that it may be difficult for the passenger to grasp a driving operation, a braking operation, and a steering operation with the five senses of the passenger in a vehicle in autonomous driving mode, so that, when the components of these three functions, for example, deteriorate over time and characteristic changes of these components occur, the changes may provide a factor of deterioration of target followability.

Therefore, when replacing components according to the second conceivable technique, in a vehicle in an autonomous driving mode, it may not be possible to pursue the cause based on the occupant's grasp with the five senses, and it may be difficult for the passenger to specify the component to be replaced, which adapts to resolve the characteristic change, by himself or herself. In particular, since there are a wide variety of components related to the driving operation, the braking operation, and the steering operation, the number of combinations of replacement components corresponding to differences in characteristic changes is enormous, so that the designation by the passenger may be extremely difficult. Moreover, in a vehicle in an autonomous driving mode in which opportunities for adjustment by the five senses of the occupant are limited in response to changes in motion after replacement, there may be strict requirements for compatibility of replacement components.

Furthermore, in a vehicle in an autonomous driving mode, the requirements of the compatibility after updating may be strict with respect to not only updating by replacing components related to the driving operation, the braking operation, and the steering operation, but also updating by changing the setting of the control parameter for controlling the driving state, the braking state, and the steering state to control the driving of the vehicle.

As described above, the present embodiments provide a vehicle management device that appropriately manages the state of a vehicle in order to ensure target followability. The present embodiments further provide a vehicle management method that appropriately manages the state of the vehicle in order to ensure target followability. The present embodiments further provide a vehicle management program that appropriately manages the state of the vehicle in order to ensure target followability.

Hereinafter, technical means of the present disclosure for solving the difficulties will be described.

According to the first aspect of the present embodiments, a vehicle management device, for managing a state of a vehicle equipped with a driving system for accelerating, a braking system for decelerating, and a steering system for steering as a basic function system, includes:

an anomaly determination unit configured to determine whether the vehicle has a travelling anomaly that is estimated to be related to a change in a characteristic of the basic function system in a management target scene of travelling scenes of the vehicle in which a travelling direction changes when the vehicle travels in an autonomous driving mode; and a designation output unit configured to designate and output a replacement request component that is requested to be replaced according to a determined travelling anomaly, from among a plurality of components constituting the basic function system.

According to a second aspect of the present embodiments, a vehicle management method, for managing a state of a vehicle equipped with a driving system for accelerating, a braking system for decelerating, and a steering system for steering as a basic function system, includes:

an anomaly determination step for determining whether the vehicle has a travelling anomaly that is estimated to be related to a change in a characteristic of the basic function system in a management target scene of travelling scenes of the vehicle in which a travelling direction changes when the vehicle travels in an autonomous driving mode; and a designation output step for designating and outputting a replacement request component that is requested to be replaced according to a determined travelling anomaly, from among a plurality of components constituting the basic function system.

According to a third aspect of the present embodiments, a vehicle management program includes instructions executed by a processor, for managing a state of a vehicle equipped with a driving system for accelerating, a braking system for decelerating, and a steering system for steering as a basic function system.

The instructions include:

an anomaly determination step for determining whether the vehicle has a travelling anomaly that is estimated to be related to a change in a characteristic of the basic function system in a management target scene of travelling scenes of the vehicle in which a travelling direction changes when the vehicle travels in an autonomous driving mode; and a designation output step for designating and outputting a replacement request component that is requested to be replaced according to a determined travelling anomaly, from among a plurality of components constituting the basic function system.

According to these first to third aspects, among the driving scenes of the vehicle, in the management target scene in which the driving direction changes in the autonomous driving mode, it is determined whether the vehicle has the travelling anomaly that is estimated to be related to a change in a characteristic of the basic function system including the driving system, the braking system, and the steering system. Therefore, in the first to third aspects, a replacement request component, which is requested to be replaced in accordance with the determined travelling anomaly, is designated and output from among the plurality of components that constitute the basic function system. According to this, even if a travelling anomaly related to a change in the characteristic of the basic function system that affects the target followability occurs due to a change in the travelling direction of the vehicle in the autonomous driving mode that requires the target followability, it is possible to notify the replacement request component that resolves the travelling anomaly by designating the component and outputting information of the component. Therefore, it is possible to appropriately manage the vehicle state in order to ensure target followability.

According to a fourth aspect of the present embodiments, a vehicle management device, for managing a state of a vehicle equipped with a driving system for accelerating, a braking system for decelerating, and a steering system for steering as a basic function system, includes a processor.

The processor is configured to execute:
  determining whether a travelling state change exists that is estimated to be related to a change in a characteristic of the basic function system in an autonomous driving mode of the vehicle; and
  providing a relaxation process to the vehicle to relax the travelling state change by updating the basic function system in accordance with a determined travelling state change.

According to a fifth aspect of the present embodiments, a vehicle management method, executed by a processor for managing a state of a vehicle equipped with a driving system for accelerating, a braking system for decelerating, and a steering system for steering as basic function systems, includes:
  determining whether a travelling state change exists that is estimated to be related to a change in a characteristic of the basic function system in an autonomous driving mode of the vehicle; and
  providing a relaxation process to the vehicle to relax the travelling state change by updating the basic function system in accordance with a determined travelling state change.

According to a sixth aspect of the present embodiments, a vehicle management program includes instructions stored in a storage medium and executed by a processor, for managing a state of a vehicle equipped with a driving system for accelerating, a braking system for decelerating, and a steering system for steering as a basic function system.

The instructions include:
  determining whether a travelling state change exists that is estimated to be related to a change in a characteristic of the basic function system in an autonomous driving mode of the vehicle; and
  providing a relaxation process to the vehicle to relax the travelling state change by updating the basic function system in accordance with a determined travelling state change.

According to these fourth to sixth aspects, in the autonomous driving mode of the vehicle, the presence or absence of the travelling state change estimated to be related to the change in the characteristic of the basic function system, which includes the driving system, the braking system, and the steering system, is determined. Therefore, in the fourth to sixth aspects, the vehicle is provided with the relaxation process for relaxing the travelling state change by updating the basic function system in accordance with the determined travelling state change. According to this, in an autonomous driving mode in which the target followability is required, even if the travelling state change related to the change in the characteristic of the basic function system that affect the target followability occurs, the relaxation process is performed to resolve the travelling state change. Therefore, it is possible to appropriately manage the vehicle state in order to ensure target followability.

According to a seventh aspect of the present embodiments, a vehicle management device, for managing a state of a vehicle equipped with a driving system for accelerating, a braking system for decelerating, and a steering system for steering as a basic function system, includes a processor.

The processor is configured to execute:
  determining whether a characteristic change of the basic function system exists that is estimated to provide a travelling state change in an autonomous driving mode of the vehicle; and
  providing a relaxation process to the vehicle to relax the travelling state change by updating the basic function system in accordance with a determined characteristic change.

According to an eighth aspect of the present embodiments, a vehicle management method, executed by a processor for managing a state of a vehicle equipped with a driving system for accelerating, a braking system for decelerating, and a steering system for steering as basic function systems, includes:
  determining whether a characteristic change of the basic function system exists that is estimated to provide a travelling state change in an autonomous driving mode of the vehicle; and
  providing a relaxation process to the vehicle to relax the travelling state change by updating the basic function system in accordance with a determined characteristic change.

According to a ninth aspect of the present embodiments, a vehicle management program includes instructions stored in a storage medium and executed by a processor, for managing a state of a vehicle equipped with a driving system for accelerating, a braking system for decelerating, and a steering system for steering as a basic function system.

The instructions include:
  determining whether a characteristic change of the basic function system exists that is estimated to provide a travelling state change in an autonomous driving mode of the vehicle; and
  providing a relaxation process to the vehicle to relax the travelling state change by updating the basic function system in accordance with a determined characteristic change.

According to these seventh to ninth aspects, in the autonomous driving mode of the vehicle, the presence or absence of the characteristic state change estimated to provide the travelling state change of the basic function system, which includes the driving system, the braking system, and the steering system, is determined. Therefore, in the seventh to ninth aspects, the vehicle is provided with the relaxation process for relaxing the travelling state change by updating the basic function system in accordance with the determined characteristic change. According to this, in an autonomous driving mode in which the target followability is required, even if the characteristic change of the basic function system that affects the target followability occurs, the relaxation process is performed to resolve the travelling state change relating to the characteristic change. Therefore, it is possible to appropriately manage the vehicle state in order to ensure target followability.

According to a tenth aspect of the present embodiments, a non-transitory computer readable storage medium includes instructions executed by a processor, for managing a state of a vehicle equipped with a driving system for accelerating, a braking system for decelerating, and a steering system for steering as a basic function system.

the instructions includes:
an anomaly determination step for determining whether the vehicle has a travelling anomaly that is estimated to be related to a characteristic change of the basic function system in a management target scene of travelling scenes of the vehicle in which a travelling direction changes when the vehicle travels in an autonomous driving mode; and
a designation output step for designating and outputting a replacement request component that is requested to be replaced according to a determined travelling anomaly from among a plurality of components constituting the basic function system.

According to a eleventh aspect of the present embodiments, a non-transitory computer readable storage medium includes instructions stored in a storage medium and executed by a processor, for managing a state of a vehicle equipped with a driving system for accelerating, a braking system for decelerating, and a steering system for steering as a basic function system.

the instructions includes:
determining whether a travelling fluctuation exists that is estimated to be related to a characteristic change of the basic function system in an autonomous driving mode of the vehicle; and
providing the vehicle with a relaxation process for relaxing the travelling fluctuation by updating the basic function system in accordance with a determined travelling fluctuation.

According to a twelfth aspect of the present embodiments, a non-transitory computer readable storage medium includes instructions stored in a storage medium and executed by a processor, for managing a state of a vehicle equipped with a driving system for accelerating, a braking system for decelerating, and a steering system for steering as a basic function system.

the instructions includes:
determining whether a characteristic change of the basic function system exists that is estimated to cause a travelling fluctuation in an autonomous driving mode of the vehicle; and
providing the vehicle with a relaxation process for relaxing the travelling fluctuation by updating the basic function system in accordance with a determined characteristic change.

Hereinafter, embodiments will be described with reference to the drawings. In the following description, the same reference symbols are assigned to corresponding components in each embodiment in order to avoid repetitive descriptions. When only a part of the configuration is described in the respective embodiments, the configuration of the other embodiments described before may be applied to other parts of the configuration. Further, not only the combinations of the configurations explicitly shown in the description of the respective embodiments, but also the configurations of the plurality of embodiments can be partially combined together even if the configurations are not explicitly shown if there is no problem in the combination in particular.

First Embodiment

A vehicle management device 1 according to the first embodiment shown in FIG. 1 manages the state of a vehicle 2. The vehicle 2 is, for example, a passenger car, a commercial vehicle, an emergency vehicle, or a micro mobility vehicle. The vehicle 2 is capable of steady or temporary autonomous driving in an autonomous driving mode under autonomous driving control or advanced driving support control. In particular, in the autonomous driving mode of the vehicle 2 by autonomous driving control, the vehicle management device 1 is suitable for a case where level 3 defined as a conditional autonomous driving level, such as the system executing all dynamic driving tasks in a limited area, or a higher level is realized.

Figure 2:
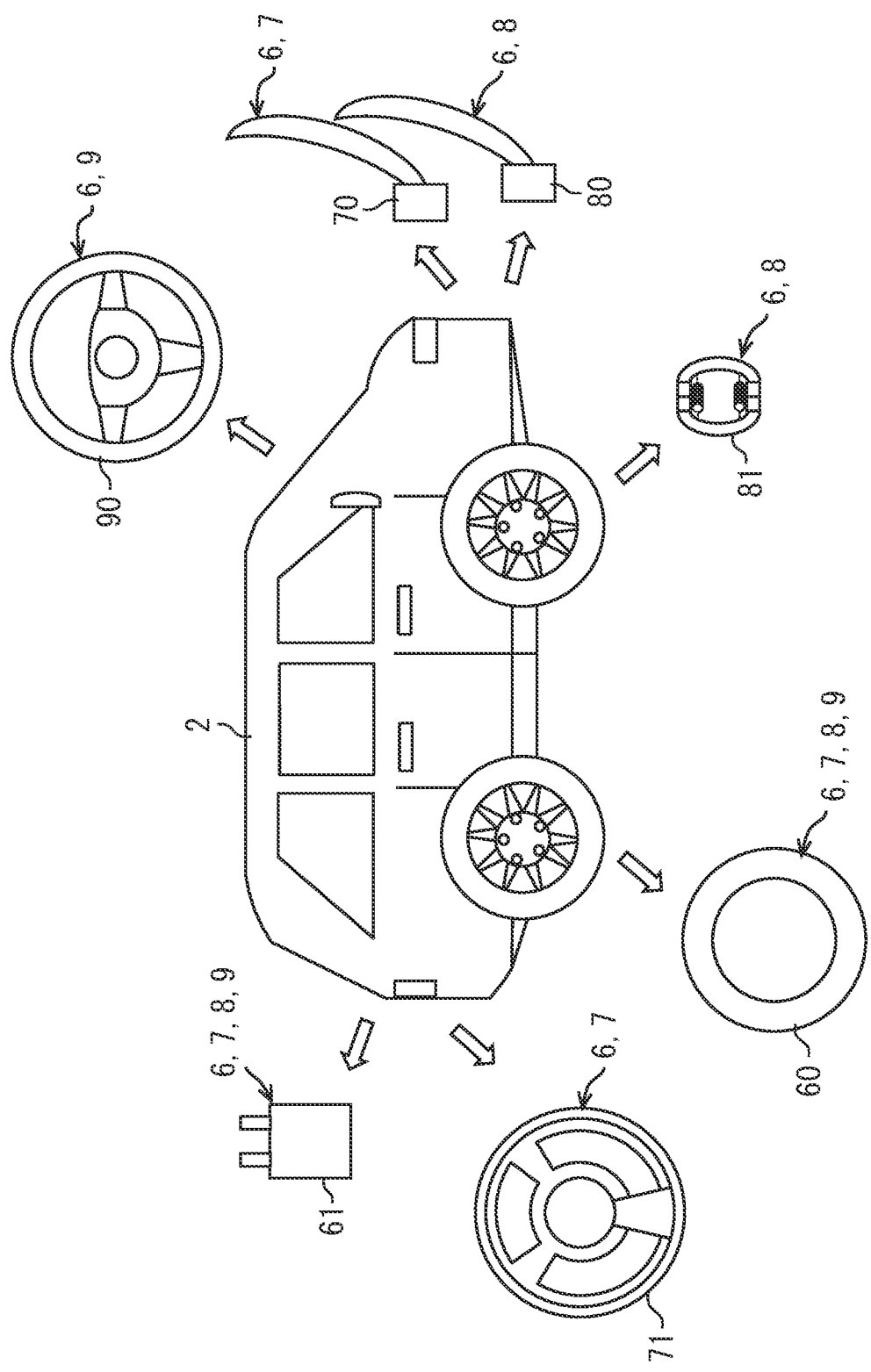
FIG. 2 is a schematic diagram showing a vehicle in which the vehicle management system according to the first embodiment is mounted and components of a basic function system.

As shown in FIG. 2, the vehicle 2 is equipped with a driving system 7, a braking system 8 and a steering system 9 as a basic function system 6. The driving system 7 includes components for accelerating the vehicle 2. The components that constitute the driving system 7 include multiple types of component, which are, for example, a tire 60, a battery 61, an accelerator pedal 70, a drive motor 71, a drive engine, a start switch, a transmission, a shift unit, and the like. The braking system 8 includes components for decelerating the vehicle 2. The components that constitute the braking system 8 include multiple types of component, which are, for example, a tire 60, a battery 61, a brake pedal 80, a friction braking unit 81, a hydraulic circuit, a regenerative motor, and the like. Here, the friction braking unit 81 includes at least one of a brake shoe and a brake drum. The steering system 9 includes components that turns the vehicle 2. The components that constitute the steering system 9 include multiple components, which are, for example, a tire 60, a battery 61, a steering wheel 90, a steering unit, a power steering motor, and the like.

In the above, the components constituting the systems 7 to 9 of the basic function system 6 may be shared between at least two systems, such as the tire 60 and the battery 61 described above. Here, the battery 61 includes, for example, a lead-acid battery, a lithium-ion battery, or the like. Further, the components constituting each of the systems 7 to 9 of the basic function system 6 may be subdivided to the level of bolts, nuts, screws, or electrical wiring, for example.

Figure 3:
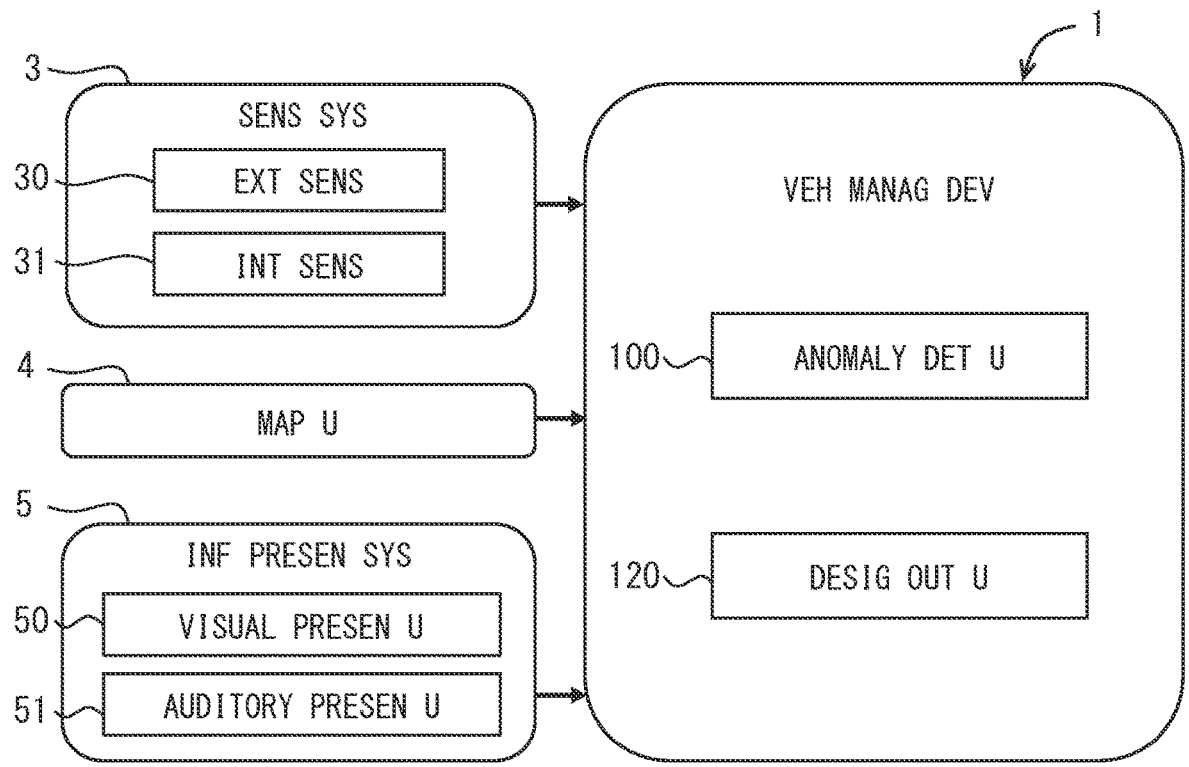
FIG. 3 is a block diagram showing the function configuration of a vehicle management device according to a first embodiment.

The vehicle 2 is equipped with a sensor system 3 as shown in FIGS. 1 and 3. The sensor system 3 acquires various kinds of information used for driving control such as autonomous driving mode in the vehicle 2. The sensor system 3 includes an external sensor 30 and an internal sensor 31.

The outside sensor 30 generates information about the outside of the vehicle 2, which is the surrounding environment of the vehicle 2. The outside sensor 30 may acquire the outside information by detecting an object existing in the outside of the vehicle 2. The external sensor 30 of the object detection type is at least one of a camera, a LIDAR (Light Detection and Ranging/Laser Imaging Detection and Ranging), a radar, sonar, and the like, for example. The outside sensor 30 may acquire the external information by receiving a signal from an artificial satellite of a GNSS (Global Navigation Satellite System) disposed in the outside of the vehicle 2 or a signal from a roadside device of ITS (Intelligent Transport Systems). The external sensor 30 of the signal reception type is at least one of, for example, a GNSS receiver, a telematics receiver, and the like.

The internal sensor 31 generates information about the inside of the vehicle 2, which is the internal environment of the vehicle 2. The internal sensor 31 may generate the internal information by detecting a specific motion physical quantity in the inside of the vehicle 2. The physical quantity sensing type internal sensor 31 is at least one of, for example, a travel speed sensor, an acceleration sensor, a Doppler speed sensor, a Bernoulli fluid speed sensor, a gyro sensor, a tire monitor, and a brake monitor. The internal sensor 31 may generate internal information by detecting a specific state regarding the occupant in the inside of the vehicle 2. Such an occupant state detection type internal sensor 31 is at least one of, for example, a driver status monitor, an actuator sensor, an in-vehicle equipment sensor, and the like.

Here, the driver status monitor detects at least one type of conditions of the passenger who drives the vehicle 2, for example, face orientation, drowsiness, posture, and the like. In the vehicle 2, the actuator sensor detects at least one of, for example, the operation positions of the pedals 70 and 80, the steering angle of the steering wheel 90, the ON/OFF state of the start switch, the shift position of the shift lever, and the like as an instruction state of the passenger relating to the driving actuator of the basic function system 6 in the vehicle 2. The in-vehicle device sensor detects at least one type of occupant's operating state of the in-vehicle device, for example, an on/off switch operating state, a touch panel operating state, a non-contact recognizable gesture operation, and the like.

A map unit 4 is mounted on the vehicle 2. The map unit 4 non-transitory stores map information used for driving control including the autonomous driving mode in the vehicle 2. The map unit 4 includes at least one type of non-transitory tangible storage medium such as a semiconductor memory, a magnetic medium, and an optical medium. The map unit 4 may be a database of locators for estimating state quantities of the vehicle 2, including its own position. The map unit 4 may be a database of navigation units for navigating the route of the vehicle 2. The map unit 4 may be a combination of such databases.

The map unit 4 acquires and stores the latest map information through wireless communication with the outside of the vehicle 2, for example. The map information is a two or three-dimensional data indicating a traveling environment of the vehicle 2. The map information may include road information representing at least one of the position, shape, road surface condition, and the like of the road itself. The map information may include traffic sign information representing at least one of the position and shape of traffic signs and lane markings attached to roads, for example. The map information may include, for example, structure information representing at least one of the positions and shapes of buildings and traffic lights facing roads.

An information presentation system 5 is mounted on the vehicle 2. The information presentation system 5 presents various types of information to the occupants of the vehicle 2. The information presentation system 5 includes a visual presentation unit 50 and an auditory presentation unit 51.

The visual presentation unit 50 conveys presentation target information by stimulating the visual sense of the occupant. The visual presentation unit 50 is at least one of, for example, a HUD (Head-up Display), an MFD (Multi Function Display), a combination meter, a navigation unit, and the like. The auditory presentation unit 51 conveys presentation target information by stimulating the auditory sense of the occupant. The auditory presentation unit 51 is, for example, at least one type of speaker, buzzer, vibration unit, and the like.

The information presentation system 5 may be installed outside the vehicle 2 using, for example, wireless communication, separately from the units 50 and 51 mounted on the vehicle 2. In this case, the installation location of the information presentation system 5 is at least one of, for example, a maintenance shop, a dealer, a remote support center, and the like. In addition, as the information presentation system 5, a mobile terminal capable of visual presentation and auditory presentation, which is owned by the passenger and is different from the units 50 and 51 mounted on the vehicle 2, may be added.

The vehicle management device 1 shown in FIG. 1 is connected to a sensor system 3, a map unit 4, and an information presentation system 5 via at least one of a LAN (Local Area Network), a wire harness, an internal bus, and the like. The vehicle management device 1 includes at least one dedicated computer. The dedicated computer that configures the vehicle management device 1 may be a driving control ECU (i.e., Electronic Control Unit) that implements driving control including an autonomous driving mode in the vehicle 2. The dedicated computer that constitutes the vehicle management device 1 may be an actuator ECU that individually controls the travel actuators of the basic function system 6 in the vehicle 2. The dedicated computer of the vehicle management device 1 may be a locator ECU that estimates a state quantity of the vehicle 2 including its own position. The dedicated computer of the vehicle management device 1 may be a navigation ECU that navigates a travel route of the vehicle 2. The dedicated computer that constitutes the vehicle management device 1 may be an HCU (i.e., HMI (i.e., Human Machine Interface) Control Unit) that controls information presentation of the information presentation system 5.

The dedicated computer of the vehicle management device 1 has at least one memory 10 and at least one processor 12. The memory 10 is at least one type of non-transitory tangible storage medium, such as a semiconductor memory, a magnetic medium, and an optical medium, for non-transitory storage of computer readable programs and data. The processor 12 includes, as a core, at least one type of, for example, a CPU (Central Processing Unit), a GPU (Graphics Processing Unit), an RISC (Reduced Instruction Set Computer) CPU, and the like.

The processor 12 executes multiple instructions included in a vehicle program stored in the memory 10. Accordingly, the vehicle management device 1 constructs a plurality of function units (that is, function blocks) for managing the state of the vehicle 2. Thus, in the vehicle management device 1, the vehicle management program stored in the memory 10 for managing the state of the vehicle 2 causes the processor 12 to execute a plurality of commands, thereby constructing a plurality of function units. The plurality of function units constructed by the vehicle management device 1 include an anomaly determination unit 100 and a designation output unit 120, as shown in FIG. 3.

Figure 4:
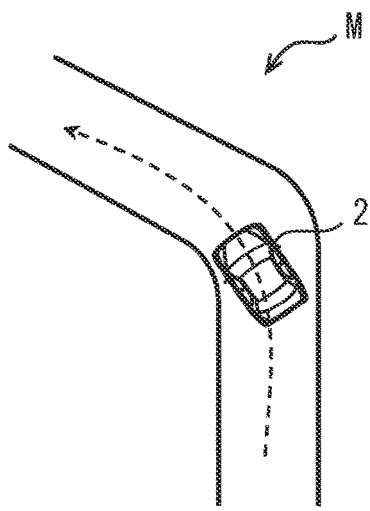
FIG. 4 is a schematic diagram showing a management target scene by the vehicle management device according to the first embodiment.
Figure 5:
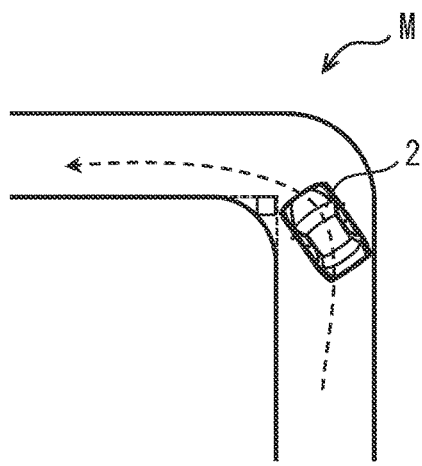
FIG. 5 is a schematic diagram showing a management target scene by the vehicle management device according to the first embodiment.
Figure 6:
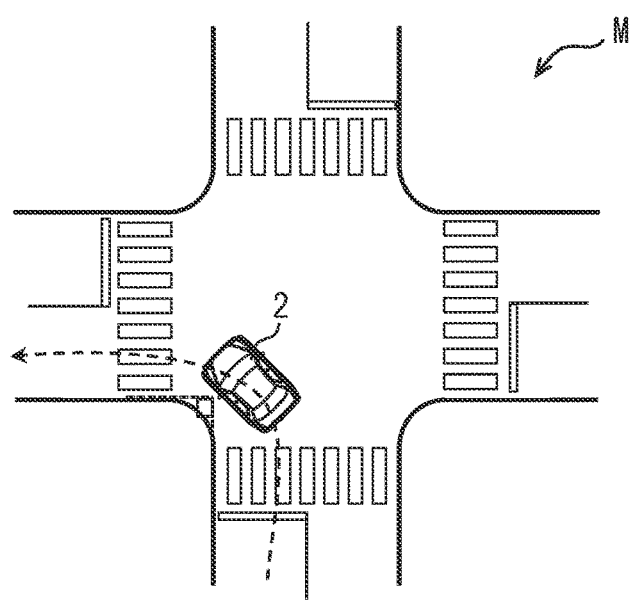
FIG. 6 is a schematic diagram showing a management target scene by the vehicle management device according to the first embodiment.
Figure 7:
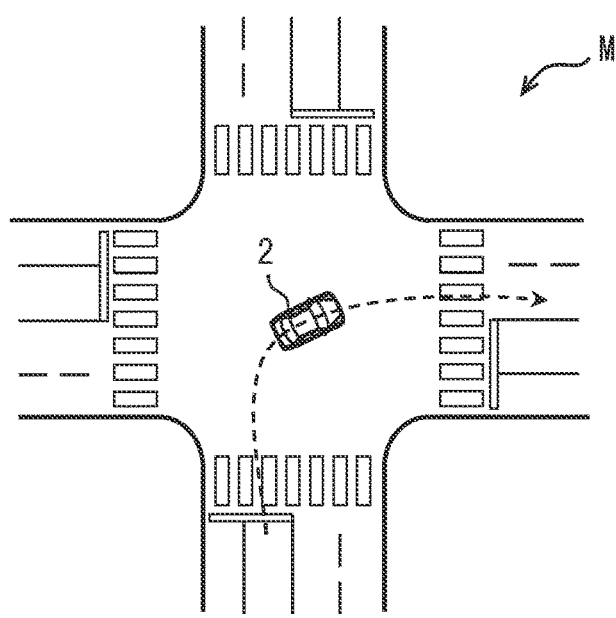
FIG. 7 is a schematic diagram showing a management target scene by the vehicle management device according to the first embodiment.

The anomaly determination unit 100 determines whether or not there is an estimated driving anomaly in a management target scene M as shown in FIGS. 4 to 7 among travel scenes of the vehicle 2. Here, the management target scene M is defined as a travel scene at a curved driving point where the driving direction in the autonomous driving mode changes depending on, for example, the curvature of the driving road or passing through an intersection. Specifically, the management target scene M includes a travel scene in which the driving direction after the change inclines at an angle of 45 degrees or more with respect to the driving direction before the change, as shown in FIGS. 4 to 6. In particular, the management target scene M includes a driving scene in which the number of lanes in the changed driving direction becomes plural as shown in FIG. 7.

The travel anomaly determined by the anomaly determination unit 100 means an anomaly that is estimated to be related to characteristic changes induced in the systems 7 to 9 of the basic function system 6 in the management target scene M. Further, the characteristic change associated with such travel anomaly means that the characteristic (that is, performance) of the components constituting each of the systems 7 to 9 varies from the initial characteristic due to deterioration over time, for example. From these meanings, the travel anomaly includes an anomaly candidate that is estimated to occur in advance based on the result obtained by analyzing the past data such as big data for each characteristic change of each system 7 to 9 in the assumed management target scene M, or for each combination of two systems among those characteristic changes. Therefore, the anomaly determination unit 100 determines whether or not at least one of the following anomaly Rt and Rv shown in FIGS. 8 and 9 is a travel anomaly.

Figure 8:
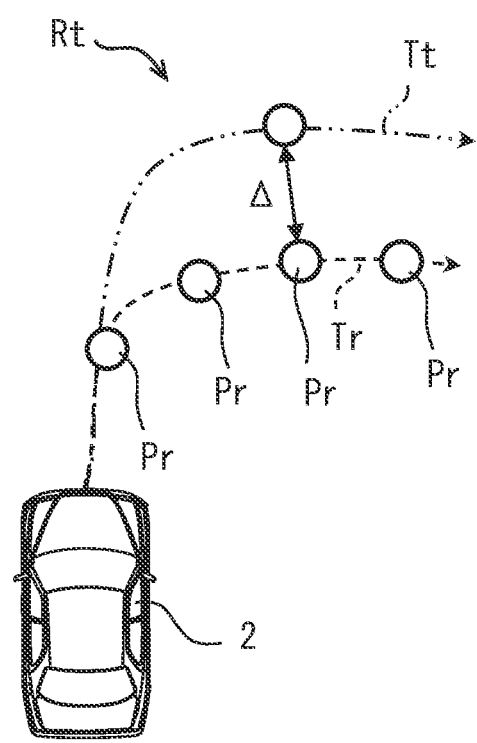
FIG. 8 is a schematic diagram for explaining a trajectory following anomaly of the vehicle management device according to the first embodiment.
Figure 9:
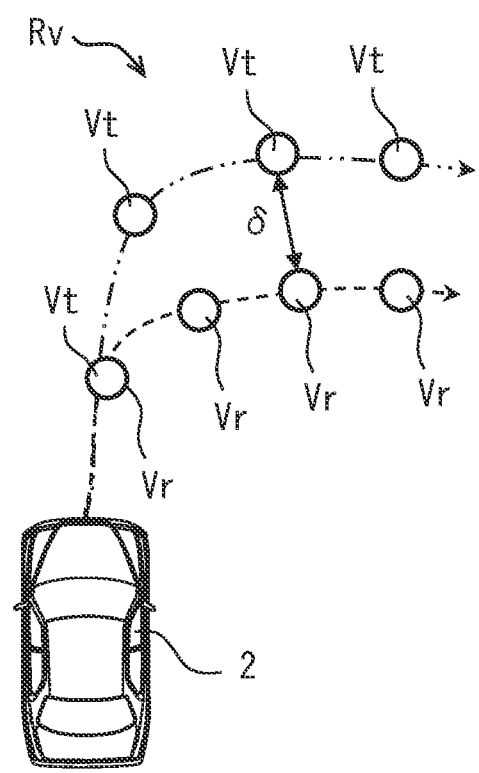
FIG. 9 is a schematic diagram for explaining a speed following anomaly of the vehicle management system according to the first embodiment.

As shown in FIG. 8, the trajectory following anomaly Rt is a target followability anomaly in which the difference $\Delta$ between the target trajectory Tt and the actual traveling position Pr of the vehicle 2 deviates from the allowable range. Therefore, the anomaly determination unit 100 that determines the trajectory following anomaly Rt acquires the target trajectory Tt based on the target parameter, which is the target value of the travel parameter for controlling the drive operation of the vehicle 2 in the autonomous driving mode. In addition, the anomaly determination unit 100 that determines the trajectory following anomaly Rt acquires the actual travelling position Pr based on the acquisition information by the external sensor 30 of at least one of an object detection type sensor and a signal reception type sensor or a matching result of the acquisition information and the map information in the map unit 4 (for example, including the result of self-position estimation).

The anomaly determination unit 100 determines the trajectory following anomaly Rt from the target trajectory Tt and the actual traveling position Pr thus obtained. At this time, the anomaly determination unit 100 may use the sum or the average value of the differences $\Delta$ between the target trajectory Tt in the set section and the actual trajectory Tr obtained by internally interpolating a plurality of actual traveling positions Pr in the set section, to determine the trajectory following abnormality Rt, thereby increasing the determination accuracy. Alternatively, the anomaly determination unit 100 may use the difference $\Delta$ between the representative point corresponding to the actual traveling position Pr on the target trajectory Tt and the actual traveling position Pr for determination of the trajectory following anomaly Rt, so that the determination calculation resource can be saved.

Figure 10:
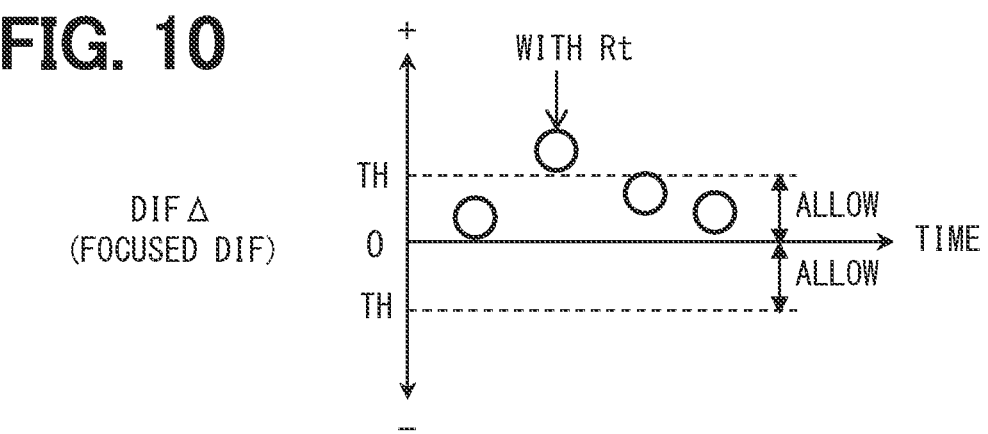
FIG. 10 is a schematic diagram for explaining a trajectory following anomaly of the vehicle management device according to the first embodiment.
Figure 11:
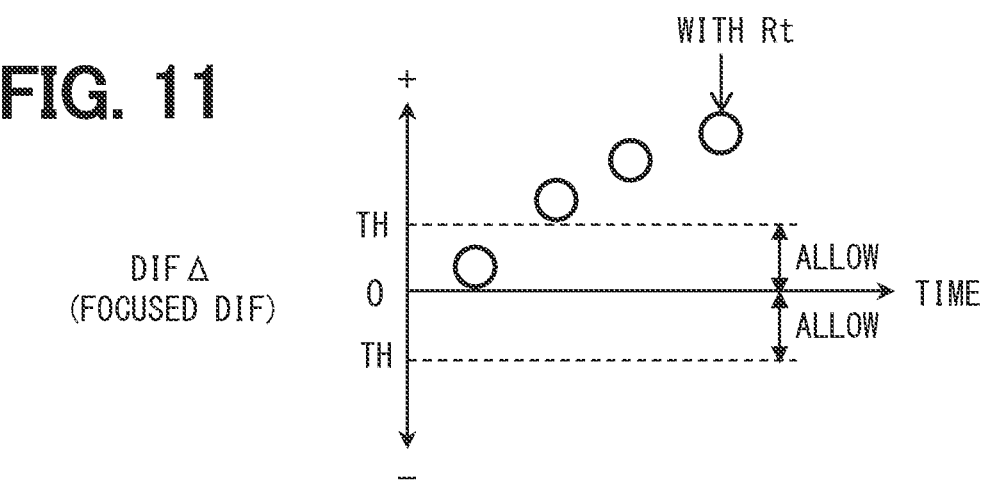
FIG. 11 is a schematic diagram for explaining a trajectory following anomaly of the vehicle management device according to the first embodiment.

The allowable range for the difference $\Delta$ of the trajectory following anomaly Rt is defined as a range equal to or less than the threshold or less than the threshold. Under this definition, the anomaly determination unit 100 tentatively determines that there is a trajectory following anomaly Rt when the difference $\Delta$ deviates from the allowable range, that is, when the difference $\Delta$ exceeds or is equal to or larger than the threshold. At this time, the anomaly determination unit 100 may tentatively determine the trajectory following anomaly Rt when the difference $\Delta$ is disposed outside the allowable range at each control timing as shown in FIG. 10. Alternatively, as shown in FIG. 11, the anomaly determination unit 100 may tentatively determine the trajectory following anomaly Rt when the difference $\Delta$ is disposed out of the allowable range continuously or on average at a plurality of control timings.

On the other hand, as shown in FIG. 9, the speed following anomaly Rv is a target followability anomaly different from the trajectory following anomaly Rt, in which the difference $\delta$ between the target speed Vt and the actual travel speed Vr of the vehicle 2 deviates from the allowable range. Therefore, the anomaly determination unit 100 that determines the speed following anomaly Rv acquires the target speed Vt based on the target parameter for controlling the driving operation of the vehicle 2 in the autonomous driving mode. Further, the anomaly determination unit 100 that determines the speed following anomaly Rv acquires the actual traveling speed Vr based on the information acquired by the internal sensor 31 of the physical quantity detection type sensor.

The anomaly determination unit 100 executes the determination of the speed following anomaly Rv from the target speed Vt and the actual traveling speed Vr thus obtained. At this time, the anomaly determination unit 100 may use the difference $\delta$ between the target speed Vt and the actual travel speed Vr of the vehicle 2 at one determination timing for determination of the speed following anomaly Rv, so that the determination calculation resource can be saved. Alternatively, the anomaly determination unit 100 may determine the speed following anomaly Rv by using the difference $\delta$ between the summed or averaged values of the target speed Vt and the actual travel speed Vr at a plurality of determination timings in the set section, so that the accuracy of determination may be improved.

Figure 12:
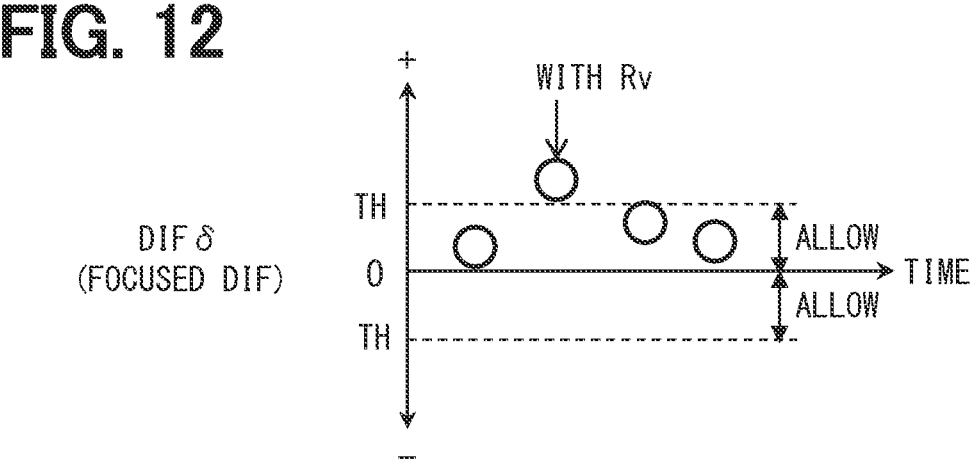
FIG. 12 is a schematic diagram for explaining a speed following anomaly of the vehicle management system according to the first embodiment.
Figure 13:
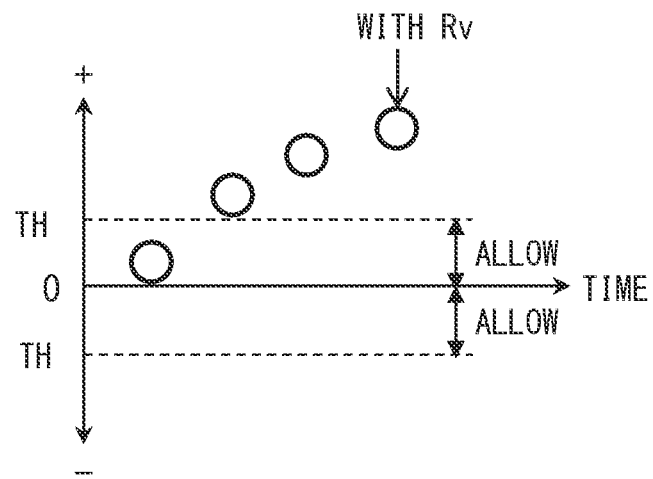
FIG. 13 is a schematic diagram for explaining a speed following anomaly of the vehicle management system according to the first embodiment.

The allowable range for the difference $\delta$ of the speed following anomaly Rv is defined as a range equal to or less than the threshold or less than the threshold. Under this definition, the anomaly determination unit 100 tentatively determines that there is a speed following anomaly Rv when the difference $\delta$ deviates from the allowable range, that is, when the difference $\delta$ exceeds or is equal to or larger than the threshold. At this time, the anomaly determination unit 100 may tentatively determine the speed following anomaly Rv when the difference $\delta$ is disposed outside the allowable range at each control timing as shown in FIG. 12. Alternatively, as shown in FIG. 13, the anomaly determination unit 100 may tentatively determine the speed following anomaly Rv when the difference $\delta$ is disposed out of the allowable range continuously or on average at a plurality of control timings.

Figure 14:
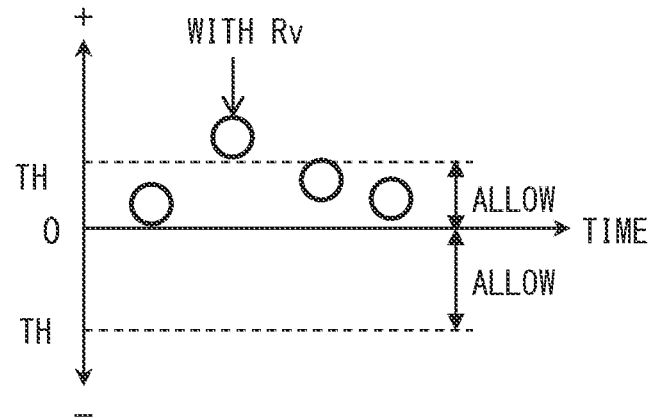
FIG. 14 is a schematic diagram for explaining a speed following anomaly of the vehicle management system according to the first embodiment.

Here, the threshold for determining the allowable range for the difference $\delta$ of the speed following anomaly Rv may be set to a value corresponding to the magnitude relationship between the target speed Vt and the actual travel speed Vr. For example, as shown in FIG. 14, the threshold for determining the case of "Vr−Vt>0" may be set smaller than the threshold for determining the case of "Vr−Vt<0", so that it is possible to prevent the actual traveling speed Vr from becoming excessively higher than the target speed Vt due to changes in characteristics of the basic function system 6.

The anomaly determination unit 100 estimates whether the travel anomaly relates to a factor other than the characteristic change when at least one of the differences $\Delta$ and $\delta$ for determining the following anomalies Rt and Rv as the focused difference (see FIGS. 10 to 14), with which the tentative determination is made, deviates from the allowable range. As a result, when the estimation that it is related to another factor is not established, the anomaly determination unit 100 confirms the tentative determination that there is a travel anomaly. On the other hand, when the estimation that it is not related to the characteristic change of the basic function system 6, i.e., it is related to another factor, the anomaly determination unit 100 discards the tentative determination.

Figure 15:
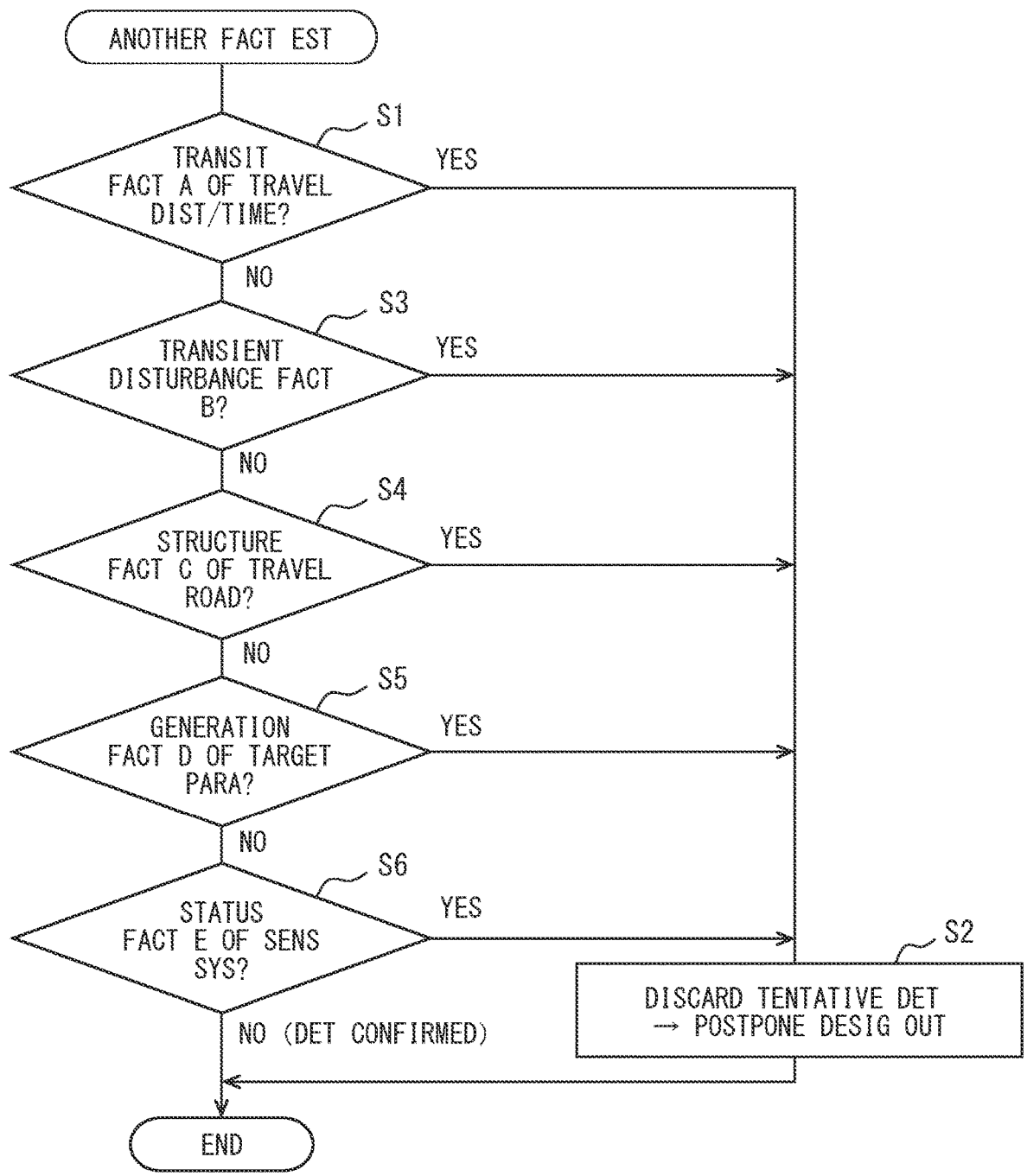
FIG. 15 is a flowchart for explaining factor estimation of the vehicle management device according to the first embodiment.

Here, another factor includes at least one of factors A to E shown in the flow of FIG. 15. Specifically, the factor A is a factor of transit distance or time traveled by the vehicle 2. Therefore, for example, when the travel distance or travel time from the start of use of each replacement request component X is equal to or less than the determination reference value or less than the determination reference value, in S1, it is determined that the relation estimation with the factor A is established. Then, in S2, the tentative determination made by the anomaly determination unit 100 is discarded.

Factor B is a transient disturbance factor in the vehicle 2. Therefore, for example, when the focused difference at the same traveling location is irregularly outside the allowable range due to the weather or road surface conditions, in S3, it is determined that the relation estimation with the factor B is established. Then, at S2, the tentative determination made by the anomaly determination unit 100 is discarded.

Factor C is a structural factor of the travel road on which the vehicle 2 travels. Therefore, for example, when the curvature of the traveling road exceeds the determination reference value or is equal to or larger than the determination reference value, and in the case of a structure in which the focused difference outside the allowable range is likely to occur, it is determined in S4 that the relation estimation with the factor C is established. Then, in S2, the tentative determination made by the anomaly determination unit 100 is discarded.

Factor D is a target parameter generation factor in the vehicle 2. Therefore, for example, when the time required from the generation of the target parameter for the target trajectory Tt to the entry into the curved travelling location in the management target scene M exceeds the determination reference value or is equal to or larger than the determination reference value due to the existence of the obstacle or getting lost of the destination, in S5, it is determined that the relation estimation with the factor D is established. Then, in S2, the tentative determination made by the anomaly determination unit 100 is discarded.

Factor E is a status factor of the sensor system 3 mounted on the vehicle 2. Therefore, for example, when the difference between the state estimation based on the information acquired by one sensor of the sensor system 3 and the state estimation based on the information acquired by another sensor of the same system 3 exceeds the determination reference value or is equal to or larger than the determination reference, in S6, it is determined that the relation estimation with the factor E is established. Then, in S2, the tentative determination made by the anomaly determination unit 100 is discarded. Here, the state estimation may be performed with respect to the position or the speed of the vehicle 2 using, for example, a Kalman filter.

In addition, when discarding the tentative determination due to these factors A to E, for example, at least one of calibration or replacement of the sensor system 3, updating of the driving control program in the vehicle 2 or contacting the developer, updating of the detection logic in the sensor system 3, and regeneration of the target trajectory Tt may be executed together.

Figure 16:
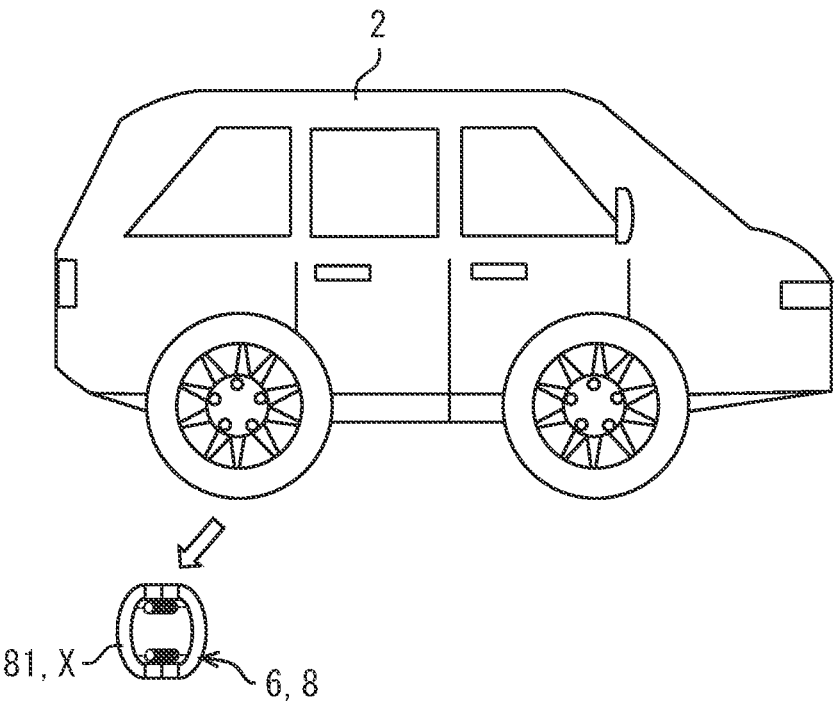
FIG. 16 is a schematic diagram for explaining designation and output of the vehicle management device according to the first embodiment.

The designation output unit 120 shown in FIG. 3 designates and outputs information of the replacement request component X for which replacement is requested, as shown in FIG. 16, according to the travel anomaly confirmed by the anomaly determination unit 100 such that the travel anomaly is determined among a plurality of components that constitute each system 7 to 9 of the basic function system 6. In other words, when the anomaly determination unit 100 discards the tentative determination, the designation output unit 120 postpones the designation and output of the replacement request component X (see S2 in the example of FIG. 15 described above).

Figure 17:
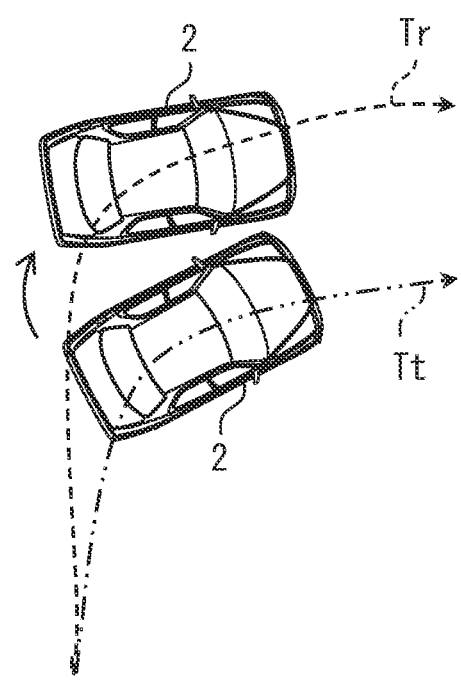
FIG. 17 is a schematic diagram for explaining designation and output of the vehicle management device according to the first embodiment.

Here, the replacement request component X is designated by a single component or a combination of a plurality of components that need to be replaced in order to restore the normal travelling from the travel anomaly that is confirmed as proper determination. Specifically, when the travel anomaly is the trajectory following anomaly Rt, it is assumed that the rear portion of the vehicle 2 moves outward in the turning direction on the actual trajectory Tr from the target trajectory Tt during turning as shown in FIG. 17, for example. In this case, for example, as shown in FIG. 16, the combination of the brake shoe and the brake drum that constitute the friction braking unit 81 of the braking system 8 is designated as the replacement request component X.

Figure 18:
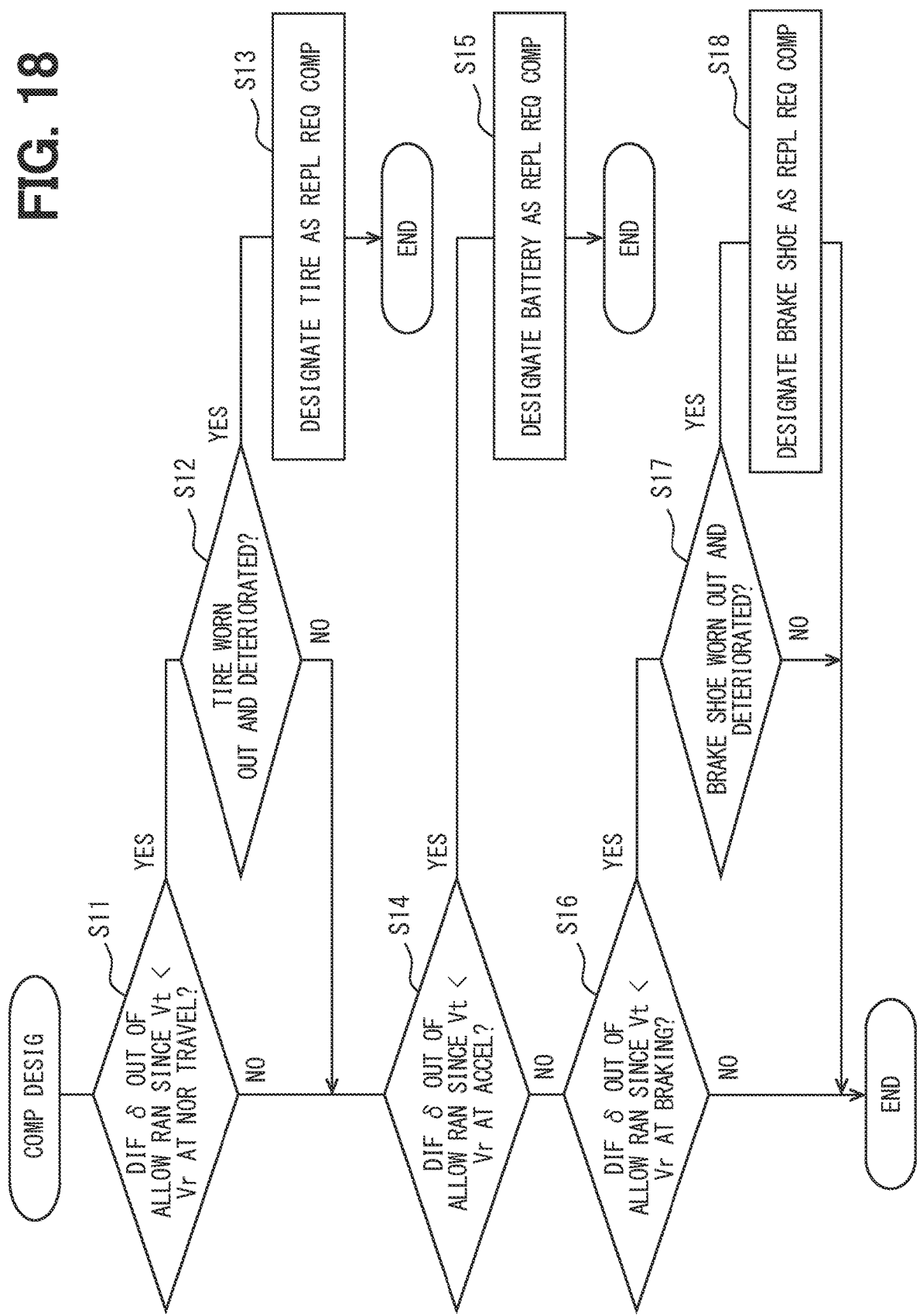
FIG. 18 is a flowchart for explaining designation and output of the vehicle management system according to the first embodiment.
Figure 19:
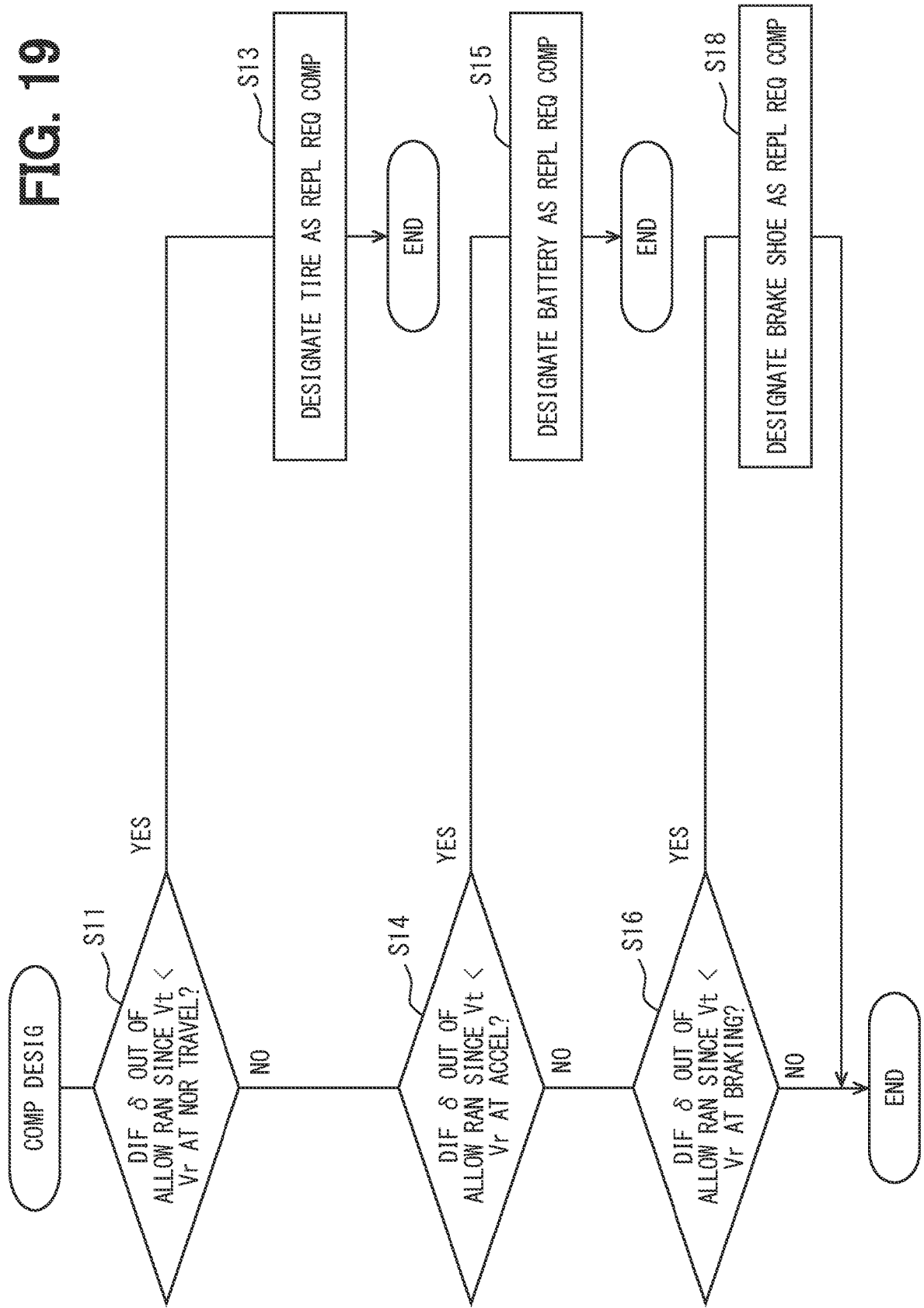
FIG. 19 is a flow chart showing a modification of FIG. 18.

On the other hand, when the travel anomaly is the speed following anomaly Rv, the components of the braking system 8 are designated as the replacement request components X based on the deceleration state of the vehicle 2 and the deterioration estimation of the basic function system 6, as shown in the flow of FIG. 18, for example. Specifically, in the example of FIG. 18, when a difference δ outside the allowable range due to a case of "Vt<Vr" (that is, a state in which it is difficult to decelerate) is confirmed in S11 in the control timing during normal travelling, it is determined by the tire monitor as the internal sensor 31 in S12 that the tire 60 wears out and is deteriorated. As a result, when wear-out deterioration of the tire 60 is confirmed, the tire 60 is designated as the replacement request component X in S13. Here, as shown in FIG. 19, the determination of S12 may not necessarily be executed. Also, although not shown, the set of S11 to S13 may be omitted.

Furthermore, in the example of FIG. 18, when the difference δ outside the allowable range due to a case of "Vr<Vt" (i.e., a state in which it is difficult to accelerate) is confirmed in S14 in the control timing during acceleration, the battery 61 is designated as the replacement request component X in S15. Furthermore, in the example of FIG. 18, when the difference Δ outside the allowable range due to a case of "Vt<Vr2 (i.e., a state in which the braking is difficult) is confirmed in S16 in the control timing during braking, the wear-out deterioration of the brake shoe of the friction braking unit 81 is checked in S17 using the brake monitor as the internal sensor 31. As a result, when wear-out deterioration of the brake shoe is confirmed, the brake shoe is designated as the replacement request component X in S18. Here, as shown in FIG. 19, the determination of S17 may not necessarily be executed. Although not shown, at least one of the set of S14 and S15 and the set of S16 to S18 may be omitted. Furthermore, although not shown, the battery 61 may be also designated as the replacement request component X when a difference Δ outside the allowable range due to a case of "Vt<Vr" (that is, a state in which it is difficult to decelerate) is confirmed in the control timing during regenerative braking.

Figure 20:
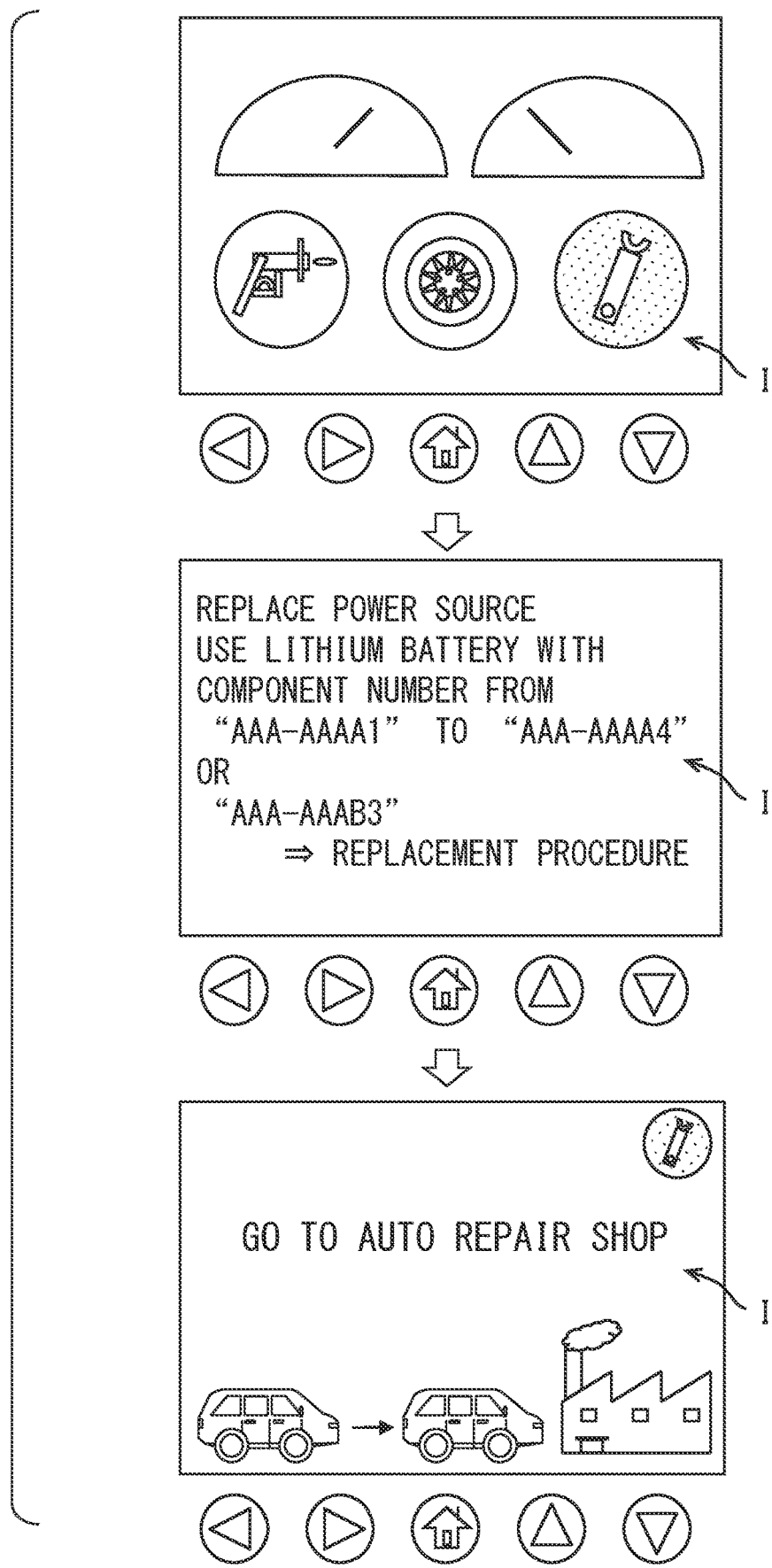
FIG. 20 is a schematic diagram for explaining designation and output of the vehicle management device according to the first embodiment.
Figure 21:
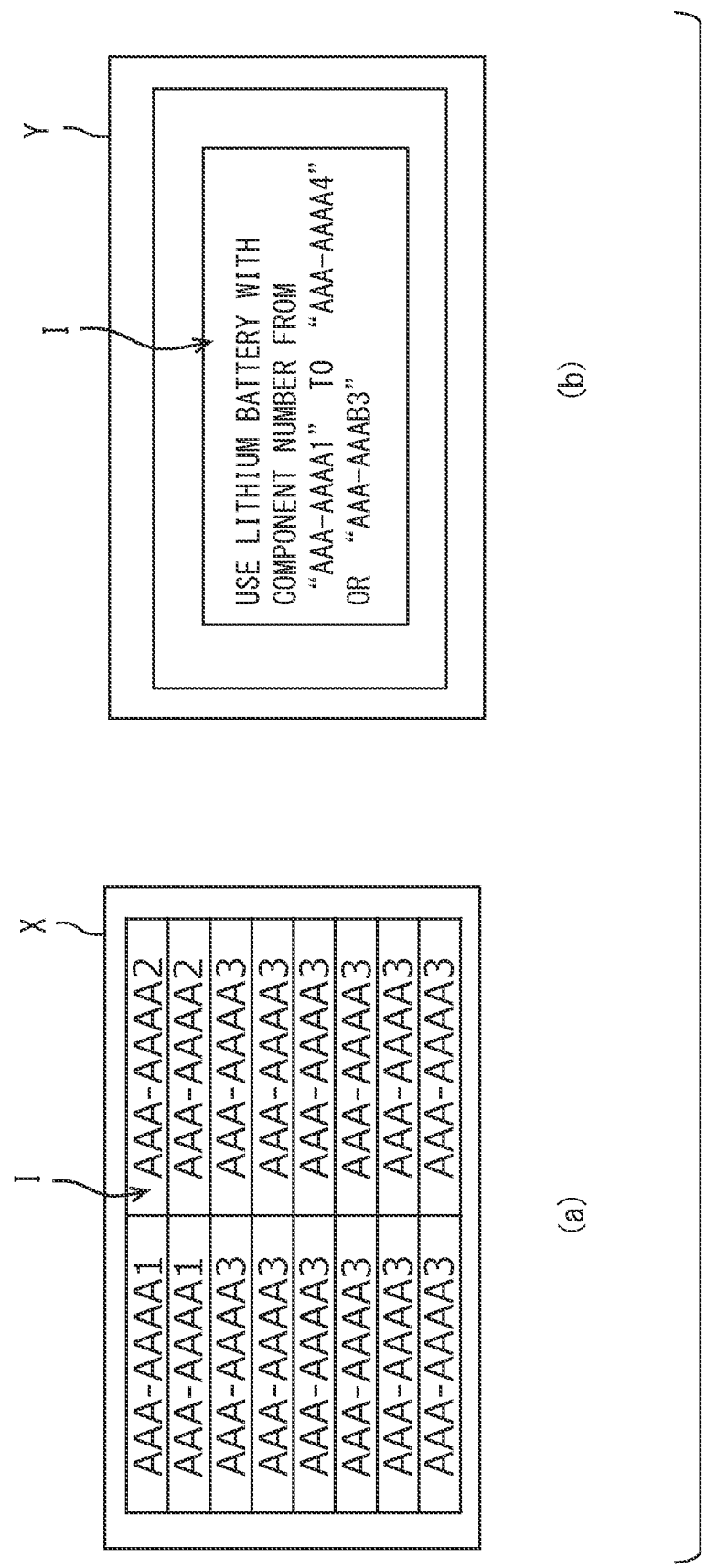
FIG. 21 is a schematic diagram for explaining designation and output of the vehicle management device according to the first embodiment.

The designation output unit 120 generates and outputs the replacement information I related to the replacement request component X designated in this way. As shown in FIGS. 20 and 21, for example, the replacement information I includes, for example, at least one of the product name, the product number, the replacement instruction, the replacement procedure, the trained replacement request destination, the precautions, the vehicle type information, and the purchase or replacement history information of the replacement request component X.

The designation output unit 120 outputs the replacement information I in the form of at least visual presentation as shown in FIG. 20 among the information presentation forms of the information presentation system 5. Here, the replacement information I is displayed by at least one of characters, marks, animations, two-dimensional codes, and the like. As the information presentation system 5 for displaying such replacement information I, the visual presentation unit 50 mounted on the vehicle 2 is necessary. In addition, at least one of the layout device outside the vehicle and the mobile terminal of the passenger may be used.

Here, the product number and the two-dimensional code of the replacement information I may be posted on the replacement required component X or its casing Y, as shown in (a) and (b) in FIG. 21. This makes it possible to prevent erroneous replacement.

Figure 22:
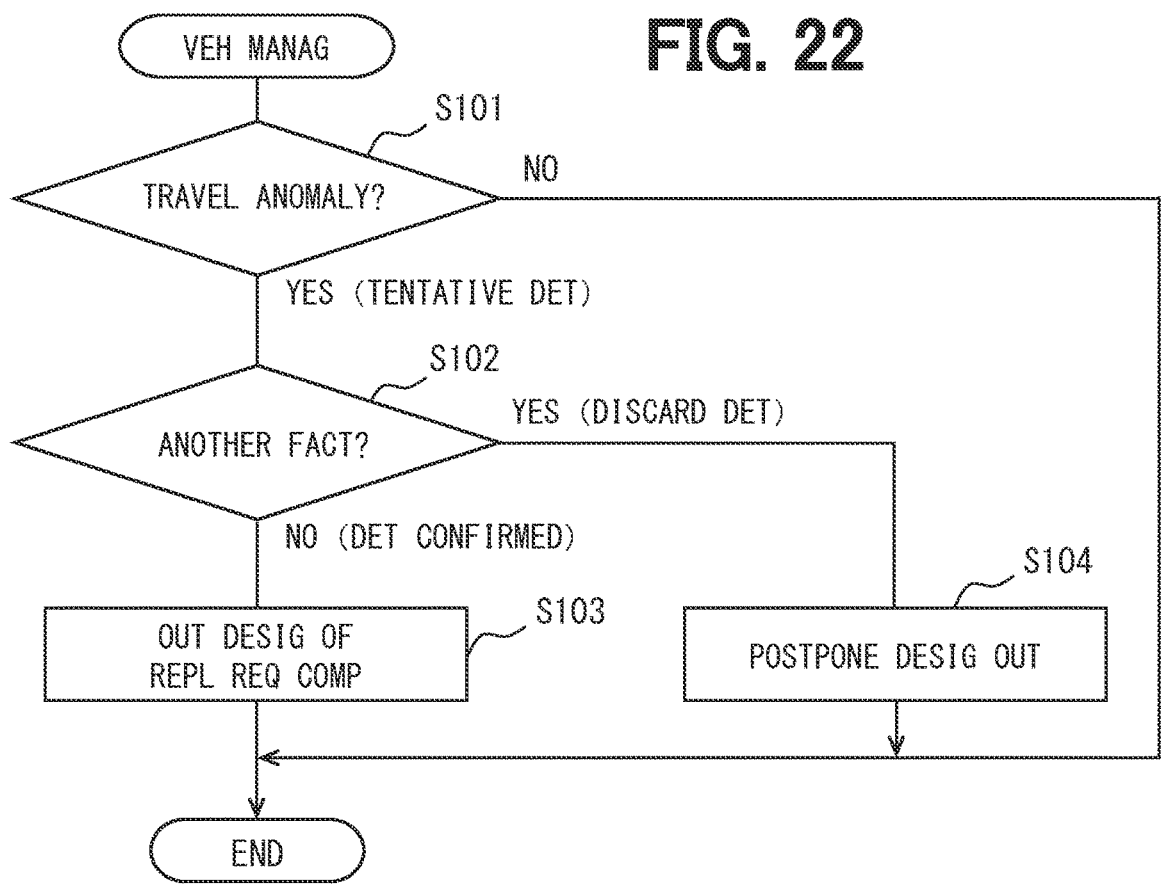
FIG. 22 is a flow chart showing a vehicle management method according to the first embodiment.

A flow of a vehicle management method in which the vehicle management device 1 manages the state of the vehicle 2 in cooperation with the function units 100 and 120 described above will be described below with reference to FIG. 22. Further, in this flow, "S" means steps of the process executed by instructions included in the vehicle management program.

In S101, the anomaly determination unit 100 determines whether or not there is a travel anomaly estimated to be related to the characteristic deterioration of the basic function system 6 in the management target scene M among the driving scenes of the vehicle 2. As a result, when at least one of the differences Δ and δ related to the following anomalies Rt and Rv as the focused difference of the travel anomaly is out of the allowable range, the anomaly determination unit 100 tentatively determines that there is a travel anomaly. Then, the flow shifts to S102.

In S102, the anomaly determination unit 100 estimates whether or not the temporarily determined travel anomaly is related to another factor other than the characteristic change. As a result, when the estimation that the travel anomaly is related to another factor is not established, the anomaly determination unit 100 confirms the tentative determination that there is a travel anomaly, and the flow shifts to S103.

In S103, the designation output unit 120 designates and outputs the replacement request component X for which replacement is requested in accordance with the travel anomaly determined by the anomaly determination unit 100 that the determination of the travel anomaly is confirmed, from among the plurality of components constituting the basic function system 6.

When it is estimated in S102 that the driving anomaly is related to another factor, the anomaly determination unit 100 discards the tentative determination that there is a travel anomaly, and the flow proceeds to S104. In S104, the designation output unit 120 postpones designation and output of the replacement request component X.

After execution of S104 and when it is determined in S101 that there is no travel anomaly, the current execution of this flow ends. Thus, in this flow, S101 and S102 correspond to the anomaly determination step, and S103 and S104 correspond to the designation output step.

(Operation Effects)

The operation and effects of the first embodiment described above will be described below.

According to the first embodiment, among the driving scenes of the vehicle 2, in the management target scene M in which the driving direction changes in the autonomous driving mode, it is determined whether the vehicle 2 has the travelling anomaly that is estimated to be related to a change in a characteristic of the basic function system 6 including the driving system 7, the braking system 8, and the steering system 9. Therefore, in the first embodiment, a replacement request component X, which is requested to be replaced in accordance with the determined travelling anomaly, is designated and output from among the plurality of components that constitute the basic function system 6. According to this, even if a travelling anomaly related to a change in the characteristic of the basic function system 6 that affects the target followability occurs due to a change in the travelling direction of the vehicle 2 in the autonomous driving mode that requires the target followability, it is possible to notify the replacement request component X that resolves the travelling anomaly by designating the component and outputting information of the component X. Therefore, it is possible to appropriately manage the vehicle state in order to ensure target followability.

According to the first embodiment, the trajectory following anomaly Rt in which the difference Δ between the target trajectory Tt and the actual traveling position Pr of the vehicle 2 deviates from the allowable range may be determined as the travel anomaly. In this case, even if a trajectory following anomaly Rt indicating a decrease in followability to the target trajectory Tt occurs, it is possible to notify the replacement request component X that conforms to the following anomaly Rt by designation and output. Therefore, it is possible to appropriately manage the state of the vehicle 2 and prompt the replacement of the component X necessary for ensuring the target followability.

According to the first embodiment, the speed following abnormality Rv in which the difference δ between the target speed Vt and the actual travel speed Vr of the vehicle 2 deviates from the allowable range may be determined as the travel anomaly. In this case, even if a speed following anomaly Rv that causes a decrease in followability to the target trajectory Tt due to a deterioration in turning maneuverability that depends on the followability to the target speed Vt occurs when the vehicle 2 changes in the traveling direction, the replacement request component X that conforms to the following anomaly Rv can be notified by designation and output. Therefore, it is possible to appropriately manage the state of the vehicle 2 and prompt the replacement of the component X necessary for ensuring the target followability.

According to the first embodiment, when at least one of the difference Δ between the target trajectory Tt and the actual travel position Pr and the difference δ between the target speed Vt and the actual travel speed Vr deviates from the allowable range, it is estimated that the travel anomaly is related to another factor other than the characteristic change, and the designation and the output of the replacement request component X is postponed. In particular, the other factor here includes at least one of the transit factor A of the distance or time traveled by the vehicle 2, the transient disturbance factor B in the vehicle 2, the structural factor C of the road on which the vehicle 2 travels, and the target parameter generation factor D in the vehicle 2, and the status factor E of the sensor system 3 mounted on the vehicle 2. According to this, the designation and output of the replacement request component X can be limited to the travel anomaly related to the characteristic change of the basic function system 6 and adapted. Therefore, it is possible to ensure the reliability with the effect of appropriately managing the state of the vehicle 2 and promoting the replacement of the component X necessary for ensuring the target trajectory followability.

According to the first embodiment, when designating and outputting a replacement request component X, the replacement information I to be displayed in relation to the component X is generated. According to this, by displaying the replacement information I, the replacement request component X can be notified directly. Therefore, it is possible to enhance the effect itself of appropriately managing the state of the vehicle 2 and promoting replacement of the component X necessary for ensuring target followability.

According to the first embodiment, the management target scene M includes a driving scene of the vehicle 2 in which the driving direction after the change is inclined by 45 degrees or more with respect to the driving direction before the change. According to this, when a travel anomaly occurs in a driving scene in which the characteristic change of the braking system 8 has a large effect, particularly in a management target scene M that requires target followability, a replacement request component X suitable for the travel anomaly is notified by the designation and output. Therefore, it is possible to prompt the replacement of the component X necessary for ensuring the target followability by the proper management of the state of the vehicle 2 in consideration of safety due to a change in the travel direction.

According to the first embodiment, a travel scene of the vehicle 2 in which the number of lanes in the changed driving direction is plural is included. According to this, if a travel anomaly occurs in a driving scene that tends to mislead traffic participants because the destination of the driving direction change has a plurality of lanes, in particular, among the management target scenes M that require target followability, the replacement request component X that matches the travel anomaly can be notified by the designation and output. Therefore, it is possible to prompt the replacement of the component X necessary for ensuring target followability by the proper management of the state of the vehicle 2 in consideration of traffic participants.

Second Embodiment

A second embodiment is a modification of the first embodiment.

Figure 23:
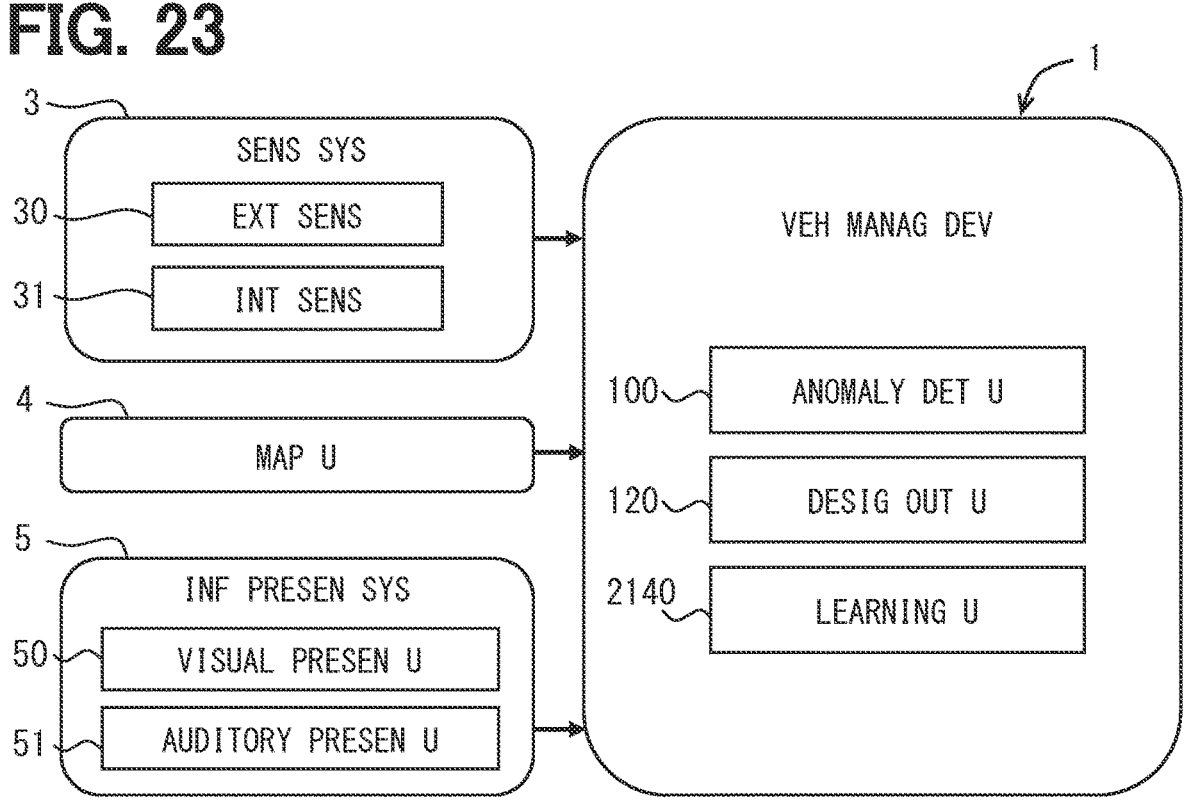
FIG. 23 is a block diagram showing the detailed configuration of a vehicle management device according to a second embodiment.
Figure 24:
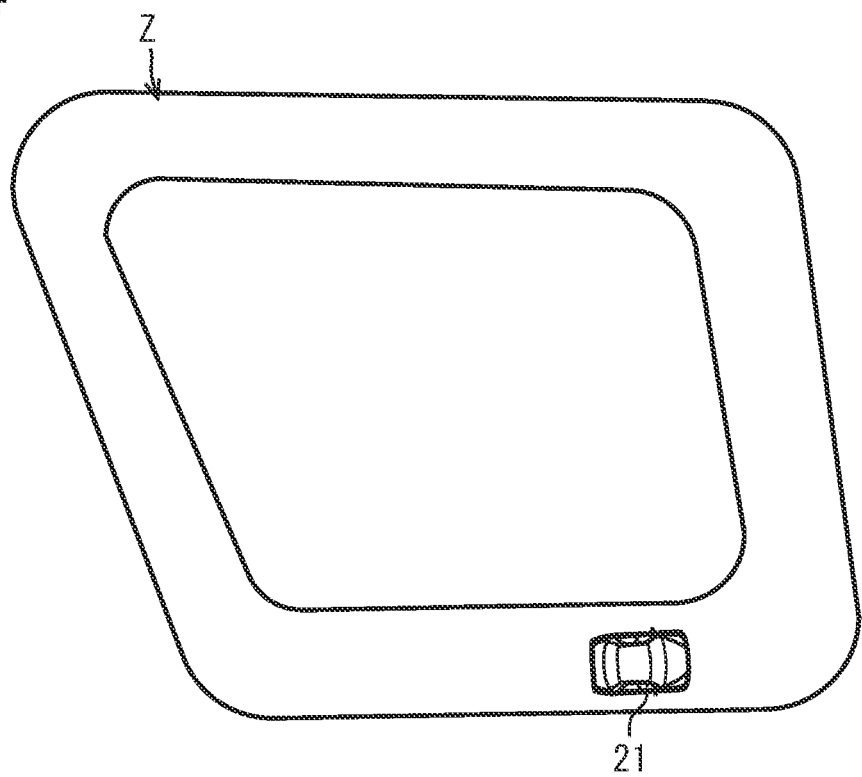
FIG. 24 is a schematic diagram for explaining learning of the vehicle management device according to the second embodiment.

In addition to the anomaly determination 100 and the designation output unit 120, a learning unit 2140 is included as shown in FIG. 23 as the plurality of function units established by the vehicle management device 1 according to the second embodiment. The learning unit 2140 learns a target parameter, which is a control parameter for controlling the driving of the vehicle 2 in any driving scene including the management target scene M, based on the results of the driving. Here, the learning is performed using, for example, a machine learning model such as a neural network. The timing of such learning is normally when the vehicle 2 is running or stopped on the travel road. The timing may be when the vehicle is running or stopped on a test course Z, as shown in FIG. 24, just after the replacement request component X is actually replaced, for example.

(Operation Effects)

The operation and effect of the second embodiment described above will be described below.

According to the second embodiment, the target parameter for controlling the driving of the vehicle 2 in the management target scene M is learned based on the results of the driving. According to this, in the second embodiment, in which the replacement request component X for resolving the travel anomaly is notified by the designation and output as in the first embodiment, it is possible to prevent a situation in which an inappropriate target parameter is learned without replacing the component X necessary for ensuring the target followability. Furthermore, after the component X is actually replaced, it becomes possible to learn the target parameter suitable for the component X after the replacement.

Third Embodiment

The third embodiment is a modification obtained by combining the first embodiment and the second embodiment and adding an execution function.

In the vehicle 2, the driving system 7 of the basic function system 6 also includes a control system for setting a control parameter for controlling the operation of the vehicle 2 by the same system 7 and variably adjusting the driving state. Similarly, in the vehicle 2, the braking system 8 of the basic function system 6 includes a control system for setting a control parameter for controlling the operation of the vehicle 2 by the same system 8 and variably adjusting the braking state. Further, the steering system 9 of the basic function system 6 in the vehicle 2 includes a control system for setting a control parameter for controlling the operation of the vehicle 2 by the same system 9 and variably adjusting the steering state. The control system of each system 7 to 9 may be common between at least two systems, or may be independent of each other. Therefore, the control system of each system 7 to 9 may include at least one of the driving control ECU, the actuator ECU, and other ECUs.

Figure 25:
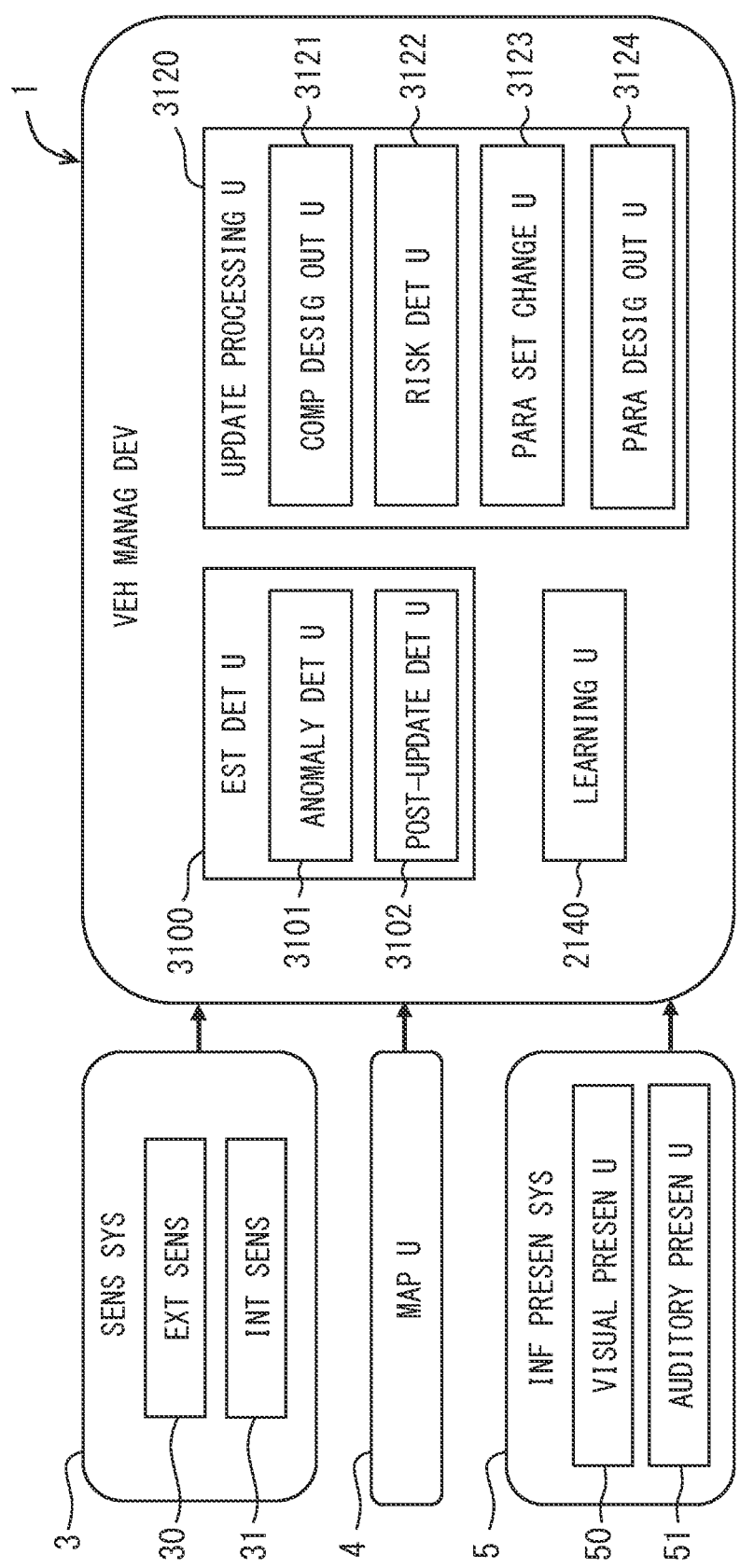
FIG. 25 is a block diagram showing the function configuration of a vehicle management device according to a third embodiment.

A plurality of function units constructed by the vehicle management device 1 of the third embodiment include an estimation determination unit 3100, an update processing unit 3120, and a learning unit 2140 as shown in FIG. 25. The estimation determination unit 3100 includes an anomaly determination unit 3101 and a post-update determination unit 3102 as a plurality of sub-function units.

The anomaly determination unit 3101 determines presence/absence of the travel anomaly relating to the characteristic change of the component due to, for example, deterioration over time in each system 7 to 9 and presence/absence of the other factor in the case where the estimation exists, similar to the anomaly determination unit 100 according to the first embodiment, as the travelling fluctuation estimated to be related to the characteristic change of the basic function system 6 in the autonomous driving mode of the vehicle 2. Here, as the management target scene M for which the anomaly determination unit 3101 determines a travel anomaly, in addition to the curve driving scene at the corner driving scene, for example, a parking stop scene or a high speed driving scene (in the latter case, a combination with curve driving), and the like may be monitored. Further, according to such additional management target scene M, the following anomalies Rt and Rv or driving anomalies other than those anomalies Rt and Rv may be determined.

The post-update determination unit 3102 determines existence of a running fluctuation that is estimated to occur due to a change in the characteristic of the systems 7 to 9 after the update, as the traveling fluctuation that is estimated to be related to the change in the characteristic of the basic function system 6 in the autonomous driving mode of the vehicle 2. The updating of the systems 7 to 9 may be replacement of components constituting the systems 7 to 9, change in setting of control parameters by the control system of the systems 7 to 9, or both replacement and setting change. In addition, the updating of such systems 7 to 9 may include at least one type of the updating by changing a setting or by receiving the designation and output in the update process of the update processing unit 3120 described later, the updating by receiving an instruction via a communication system from the external device, the updating in a case where a predetermined condition is satisfied, and the updating by the user's intention of the vehicle 2 that is not related to the update process of the update processing unit 3120. Alternatively, the updating may include other updating procedure. Further, as the travel fluctuation determined by the post-update determination unit 3102 after updating any of the systems 7 to 9, the travel anomaly in the management target scene M is monitored according to the anomaly determination of the anomaly determination unit 3101.

The update processing unit 3120 includes a component designation output unit 3121, a risk determination unit 3122, a parameter setting change unit 3123, and a parameter designation output unit 3124 as a plurality of sub-function units. Of these, the component designation output unit 3121, the parameter setting change unit 3123, and the parameter designation output unit 3124 function to provide a relaxation process for relaxing the travel fluctuation to the vehicle 2 by updating the basic function system 6 according to the travel fluctuation determined by the estimation determination unit 3100. On the other hand, the risk determination unit 3122 functions to determine the risk level for selecting the optimum process among the relaxation processes by the parameter setting change unit 3123 and the parameter designation output unit 3124.

The component designation output unit 3121 designates and output information of the replacement request component X requesting replacement in order to relax the travel fluctuation, similar to the designation output unit 120 of the first embodiment, as the updating corresponding to the travel fluctuation that is the travel anomaly confirmed as the proper determination by the anomaly determination unit 3101. In other words, when the anomaly determination unit 3101 discards the determination, the component designation output unit 3121 postpones designation output of the replacement request component X according to the designation output unit 120 of the first embodiment.

In the component designation output unit 3121, the replacement request component X is designated and output in large units when the determination material such as the motion information of the vehicle 2 is insufficient, and when the determination material is sufficient or detailed, the component X may be designated and output in small units. Here, in a specific example relating to tires, the entire tire unit is designated and output when the determination material is insufficient, while the brake shoe is designated and output when the determination material is sufficient or detailed. In addition, even if only one side of the bilaterally symmetrical components of the vehicle 2 causes a travel anomaly, both sides may be designated and output as the replacement request components X, so that the stability and ride comfort of the vehicle 2 are enhanced. Here, in a specific example relating to tires, when the left brake shoe causes a travel anomaly, not only the left brake shoe but also the right brake shoe are designated and output.

The risk determination unit 3122 performs plans to change the setting of the relaxation parameter necessary for relaxing the travel fluctuation, as the additional updating according to the post-update travel fluctuation confirmed as the proper determination by the post-update determination unit 3102, among the control parameters of the control systems of the systems 7 to 9. Therefore, the risk determination unit 3122 determines whether or not the risk level due to the planned setting change of the relaxation parameter is within the allowable range.

Specifically, the risk determination unit 3122 may determine that the risk level is within the allowable range when the amount of change due to the setting change of the relaxation parameter is less than the threshold or equal to or less than the threshold. Further, the unit 3122 may determine that the risk level is out of the allowable range when the amount of change is equal to or larger than the threshold or exceeds the threshold. At this time, the threshold for the amount of change to the safe side may be set larger than the threshold for the amount of change to the risk side. The risk determination unit 3122 also may determines that the risk level is out of the allowable range when it is estimated that the influence on driving safety will increase due to, for example, the change of the setting of relaxation parameter for controlling the vehicle 2 in response to human detection. Further, the risk determination unit 3122 may determine that the risk level due to the update is out of the allowable range in consideration with the possibility of misjudgment, for example, while the number of times of proper determination by the post-update determination unit 3102 is small. Further, the unit 3122 may determine that the risk level is within the allowable range when the number of times of proper determination increases.

The parameter setting change unit 3123 functions when the risk level determined by the risk determination unit 3122 according to the proper determination by the post-update determination unit 3102 is within the allowable range. The parameter setting changing unit 3123 updates the relaxation parameter, which is planed to change the setting by the risk determining unit 3122, when the above condition is satisfied. That is, the parameter setting change unit 3123 changes the setting of the relaxation parameter for relaxing the travel fluctuation among the control parameters, as the additional updating according to the travel fluctuation confirmed as the proper determination by the post-update determining unit 3102, among the control parameters of the control systems of the systems 7 to 9.

Specifically, the parameter setting changing unit 3123 may return the relaxation parameter as the setting change target to the initial value when the vehicle 2 is off the line, for example, in the update when the condition is satisfied. The parameter setting change unit 3123 may adjust the value estimated or back-calculated from the characteristics of the replacement component when the previous update relates to the component replacement in the update when the condition is established. The parameter setting change unit 3123 may change the setting in a step-wise manner in the update when the condition is satisfied so that the user of the vehicle 2 suppresses the change in running due to the update. In the update when the condition is established, the parameter setting change unit 3123 may change the setting of the relaxation parameter according to the learning result of the relaxation parameter learned as the control parameter by the learning unit 2140, for example, when the vehicle 2 is running or stopped on the test course Z immediately after the component is replaced.

Here, in particular, in the learning of the relaxation parameter for changing the setting by the parameter setting change unit 3123, the driving safety during learning may be improved by controlling the driving of the vehicle 2 to change from straight driving to curve driving. In the learning of the relaxation parameter, the relaxation parameter especially related to the braking system 8 may be optimal for the deceleration scene by controlling the vehicle 2 to travel on a curve in which the travel direction after the change changes by 90 degrees or more with respect to the travel direction before the change. In the learning of the relaxation parameter, when controlling the vehicle 2 to travel on a curve path in which the traveling direction after the change changes by 45 degrees or more with respect to the traveling direction before the change, the relaxation parameter especially related to the steering timing or the steering amount of the steering system 9 may be optimized.

The parameter setting output unit 3124 functions when the risk level determined by the risk determination unit 3122 according to the proper determination by the post-update determination unit 3102 is out of the allowable range. The parameter designation output unit 3124.

designates and outputs the relaxation parameter which is planned to change the setting by the risk determination unit 3122. That is, the parameter designation output unit 3124 designates and outputs the relaxation parameter, for requesting the setting change to relax the travel fluctuation as the additional updating according to the travel fluctuation that is confirmed as the proper determination by the post-update determination unit 3102, among the control parameters by the control systems of the systems 7 to 9.

In both cases of the setting change processing by the parameter setting change unit 3123 and the designation output processing by the parameter designation output unit 3124, the target of update may be set to the control parameter with the high level when the determination material such as the motion information of the vehicle 2 is insufficient, and the update target may be set to the control parameter with the low level when the determination material is sufficient or detailed. Here, in a specific example, while the target speed is set as the target of update when the determination material is insufficient, the brake amount and the brake timing of the specific section are set as the target of update when the determination material is sufficient or detailed. In both cases of the setting change processing by the parameter setting change unit 3123 and the designation output processing by the parameter designation output unit 3124, the control parameters set for the left and right sides of the vehicle 2 may be set as the update targets even if only one of the control parameter needs to be updated. Here, in a specific example, when the control parameter related to the lane change on the left side of the vehicle 2 needs to be updated, the control parameter related to the lane change on the right side of the vehicle 2 is also set to be updated.

Figure 26:
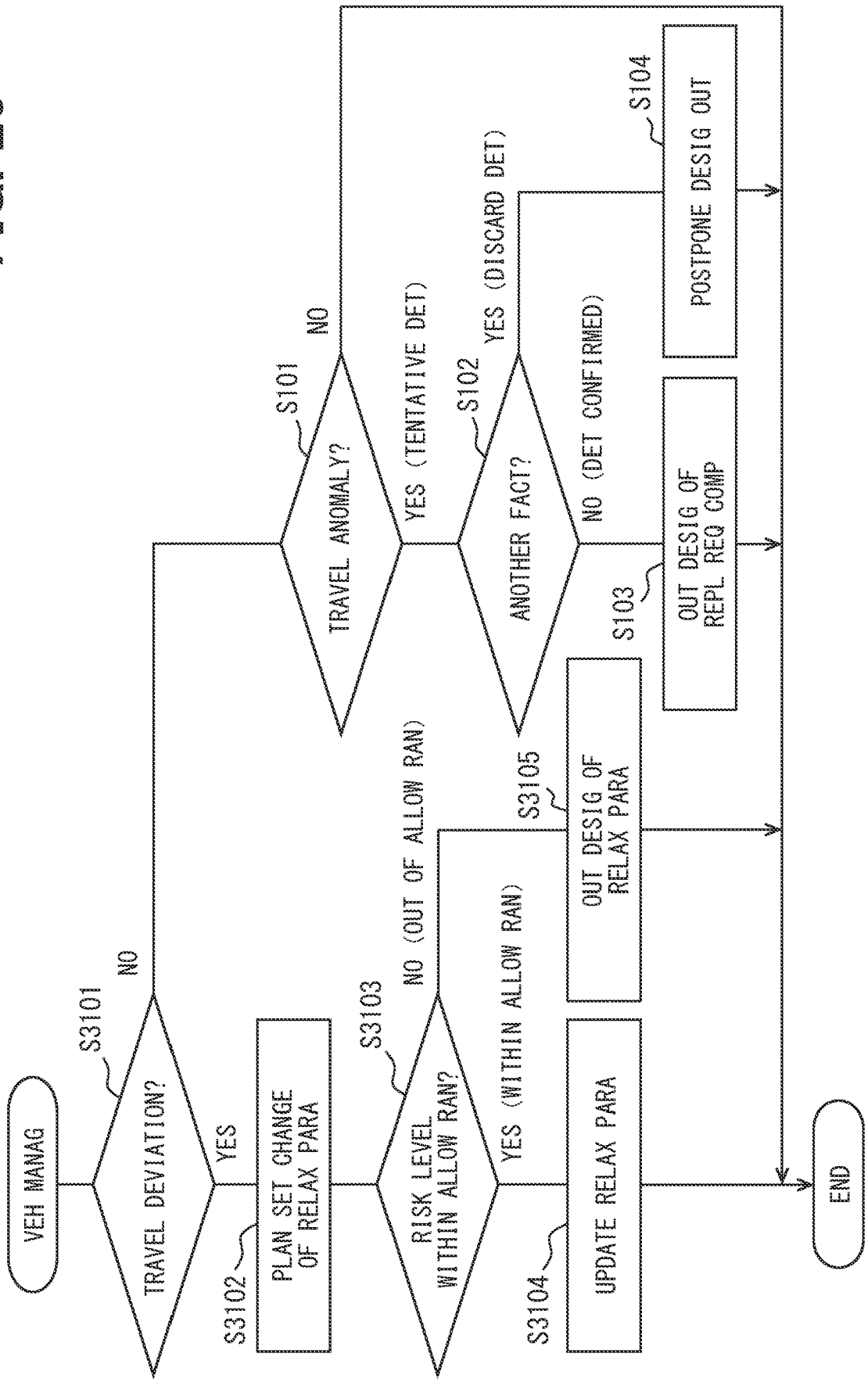
FIG. 26 is a flow chart showing a vehicle management method according to a third embodiment.

A flow of a vehicle management method in which the vehicle management device 1 manages the state of the vehicle 2 in cooperation with the function units 3100 and 3120 described above will be described below with reference to FIG. 26. Further, in this flow, "S" means steps of the process executed by instructions included in the vehicle management program.

At S3101, the post-update determination unit 3102 in the estimation determination unit 3100 determines existence of a running fluctuation that is estimated to occur due to a change in the characteristic of the systems 7 to 9 after the update, as the traveling fluctuation that is estimated to be related to the change in the characteristic of the basic function system 6 in the autonomous driving mode of the vehicle 2. As a result, when determination of "NO" is made regarding the travel fluctuation, the flow shifts to S101. Accordingly, S101 and subsequent S102 are executed by the anomaly determination unit 3101 of the estimation determination unit 3100 according to the anomaly determination unit 100 of the first embodiment. Furthermore, S103 and S104 branched from S102 are executed by the component designation output unit 3121 of the update processing unit 3120 according to the designation output unit 120 of the first embodiment.

If it is determined in S3101 that there is a travel fluctuation, the flow proceeds to S3102. At S3102, the risk determination unit 3122 performs plans to change the setting of the relaxation parameter necessary for relaxing the travel fluctuation, as the additional updating according to the post-update travel fluctuation confirmed as the proper determination at S3101, among the control parameters of the control systems of the systems 7 to 9. At subsequent S3103, the risk determination unit 3122 determines whether or not the risk level due to the planned setting change of the relaxation parameter is within the allowable range.

If it is determined in S3103 that the risk level is within the allowable range, the flow proceeds to S3104. In S3104, the parameter setting change unit 3123 updates the relaxation parameter for which the setting change is planned in S3102. If it is determined in S3103 that the risk level is out of the allowable range, the flow proceeds to S3105. In S3105, the parameter designation output unit 3124 designates and outputs the relaxation parameter whose setting change is planned in S3102.

(Operation Effects)

Hereinbelow, effects of the above third embodiment will be described.

According to the third embodiment, in the autonomous driving mode of the vehicle 2, the presence or absence of the travelling state change estimated to be related to the change in the characteristic of the basic function system 6, which includes the driving system 7, the braking system 8, and the steering system 9, is determined. Therefore, in the third embodiment, the vehicle 2 is provided with the relaxation process for relaxing the travelling state change by updating the basic function system 6 in accordance with the determined travelling state change. According to this, in an autonomous driving mode in which the target followability is required, even if the travelling state change related to the change in the characteristic of the basic function system 6 that affect the target followability occurs, the relaxation process is performed to resolve the travelling state change. Therefore, it is possible to appropriately manage the vehicle state in order to ensure target followability.

According to the relaxation processing of the third embodiment, among the plurality of components that make up the basic function system 6, the replacement request component X that is required to be updated by replacement in order to relax the determined travel fluctuation is designated and output. According to this, even if the travel fluctuation related to the change in the characteristic of the basic function system 6 that affect the target followability occur in the autonomous driving mode, the replacement request component X for resolving the travel fluctuation is notified by the designation and output. Therefore, it is possible to appropriately manage the vehicle state in order to ensure target followability.

According to the relaxation process of the third embodiment, among the control parameters for controlling the operation of the vehicle 2 by the basic function system 6, the relaxation parameter that is required to be updated by the setting change to relax the determined travel fluctuation is designated and output. According to this, even if the travel fluctuation related to the change in the characteristic of the basic function system 6 that affect the target followability occur in the autonomous driving mode, the relaxation parameter for resolving the travel fluctuation is notified by the designation and output. Therefore, it is possible to appropriately manage the vehicle state in order to ensure target followability.

According to the relaxation process of the third embodiment, among the control parameters for controlling the operation of the vehicle 2 by the basic function system 6, the relaxation parameter for relaxing the determined travel fluctuation is updated by changing the setting. According to this, even if the travel fluctuation related to the change in the characteristic of the basic function system that affect the target followability occurs in the autonomous driving mode, the relaxation parameter can be changed so as to resolve the travel fluctuation. Therefore, it is possible to appropriately manage the vehicle state in order to ensure target followability.

According to the relaxation process of the third embodiment, the risk level due to the relaxation parameter setting change for relaxing the travel fluctuation is determined. Therefore, when the determined risk level is within the allowable range, the relaxation parameter is updated by changing the setting, and when the risk level is out of the allowable range, the relaxation parameter that is required to be updated by changing the setting is designated and output. According to this, even when the travel fluctuation related to the change in the characteristic of the basic function system 6 that affect the target followability in the autonomous driving mode occurs, according to the risk level due to the setting change of the relaxation parameter that resolves the travel fluctuation, the setting change and the designation and output can be switched. Therefore, it is possible to appropriately manage the vehicle state in order to ensure target followability.

According to the third embodiment, the setting of the relaxation parameter may be changed according to the learning result based on the driving result of the vehicle 2. In the case of such a setting change by learning, even when the travel fluctuation occurs in relation to the change in the characteristic of the basic function system 6 that affect the target followability in the autonomous driving mode, the ravel fluctuation is canceled by setting change of the relaxation parameter through the learning. Therefore, it is possible to appropriately manage the vehicle state in order to ensure target followability.

Fourth Embodiment

A fourth embodiment is a modification of the third embodiment.

Figure 27:
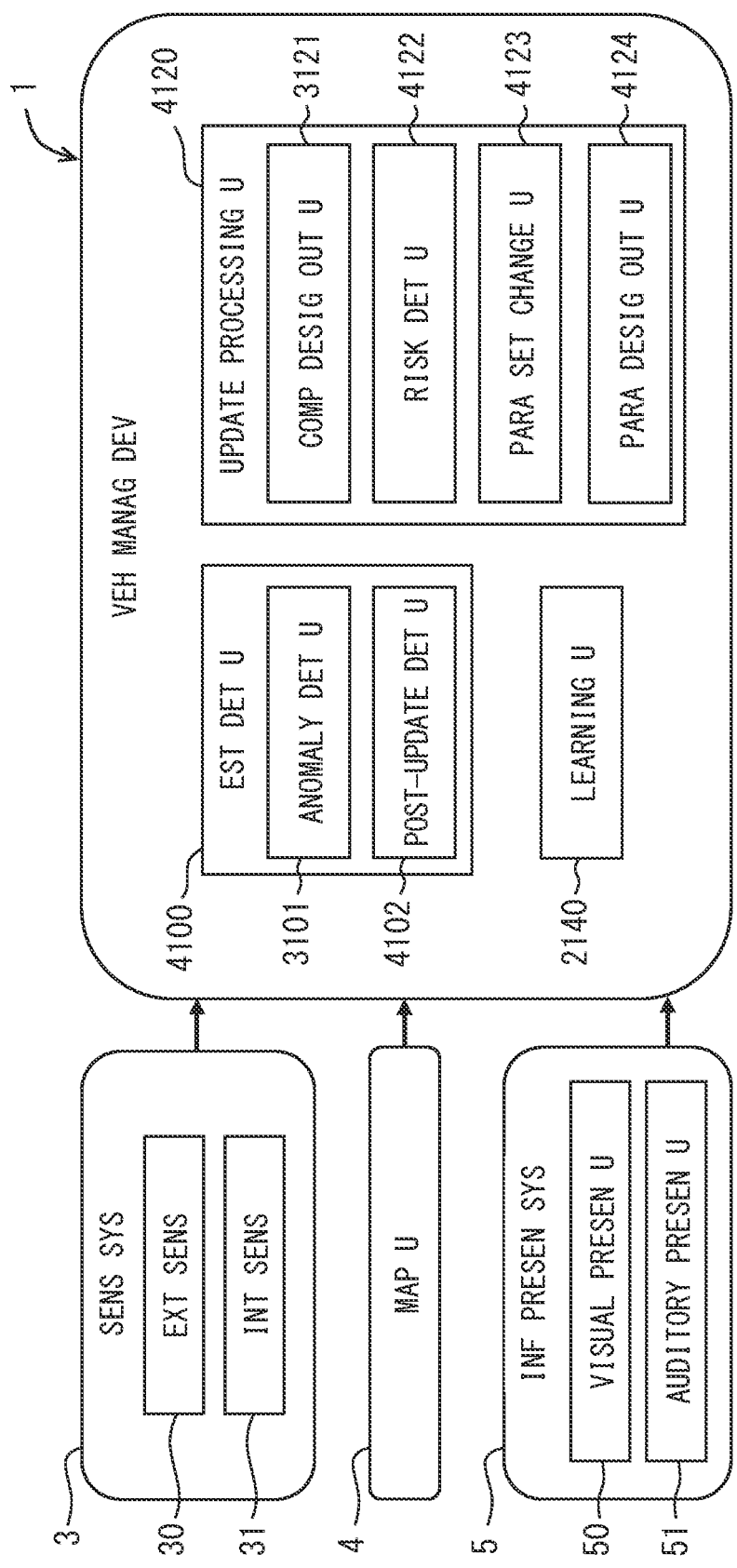
FIG. 27 is a block diagram showing the function configuration of a vehicle management device according to a fourth embodiment.

In the fourth embodiment shown in FIG. 27, the estimation determination unit 4100 includes an anomaly determination unit 3101 and a post-update determination unit 4102 as a plurality of sub-function units.

The post-update determination unit 4102 determines whether or not each of the systems 7 to 9 has been updated as a characteristic change in the basic function system 6 that is estimated to cause the travel fluctuation in the autonomous driving mode of the vehicle 2. In the fourth embodiment, the updating of the systems 7 to 9 may be replacement of components constituting the systems 7 to 9, change in setting of control parameters by the control system of the systems 7 to 9, or both replacement and setting change. In addition, the updating of such systems 7 to 9 may include at least one type of the updating by changing a setting or by receiving the designation and output in the update process of the update processing unit 4120 described later, the updating by receiving an instruction via a communication system from the external device, the updating in a case where a predetermined condition is satisfied, and the updating by the user's intention of the vehicle 2 that is not related to the update process of the update processing unit 4120. Alternatively, the updating may include other updating procedure.

Therefore, after updating the systems 7 to 9, there is a possibility that the travel fluctuation may occur at any location other than the updated location due to, for example, the balance with the updated location. Thus, the post-updating determination unit 4102 determines the presence/absence of the update by assuming that the update itself is deemed to a characteristic change of the systems 7-9. In addition, such a proper determination by the post-update determination unit 4102 may be made after all the updates, or for example, only when the need for additional update becomes high, such as when the previous update due to the reception of the designation and output from the update processing unit 4120 is performed in accordance with the travel anomaly caused by the deteriorated component with a large difference $\Delta$ or $\delta$.

In the fourth embodiment, the update processing unit 4120 includes a component designation output unit 3121, a risk determination unit 4122, a parameter setting change unit 4123, and a parameter designation output unit 4124 as a plurality of sub-function units.

The risk determination unit 4122 plans the setting change of the relaxation parameter necessary for relaxing the travel fluctuation that is estimated to occur according to the previous update, as an additional update in accordance with the previous update as the characteristic change, among the control parameters by the control systems of the systems 7 to 9, confirmed as the proper determination by the post-update determination unit 4102. Therefore, the risk determination unit 4122 determines whether or not the risk level due to the planned setting change of the relaxation parameter is within the allowable range. Note that specific determination processing by the risk determination unit 4122 of the fourth embodiment is performed according to the risk determination unit 3122 of the third embodiment.

According to the fourth embodiment, the parameter setting change unit 4123 functions when the risk level determined by the risk determination unit 4122 according to the proper determination by the post-update determination unit 4102 is within the allowable range. The parameter setting changing unit 4123 updates the relaxation parameter, which is planed to change the setting by the risk determining unit 4122, when the above condition is satisfied. That is, the parameter setting change unit 4123 changes the setting of the relaxation parameter for relaxing the travel fluctuation that is estimated to occur due to the previous update as the additional update in accordance with the previous update according to the characteristic change confirmed as the proper determination by the post-update determination unit 4102 among the control parameters by the control systems of the systems 7 to 9. Note that specific setting change processing by the parameter setting change unit 4123 of the fourth embodiment is performed according to the parameter setting change unit 3123 of the third embodiment.

According to the fourth embodiment, the parameter designation output unit 4124 functions when the risk level determined by the risk determination unit 4122 according to the proper determination by the post-update determination unit 4102 is out of the allowable range. The parameter designation output unit 4124.

designates and outputs the relaxation parameter which is planned to change the setting by the risk determination unit 4122. That is, the parameter designation output unit 4124 designates and output information of the relaxation parameter required to change the setting thereof in order to relax the travel fluctuation that is estimated to occur due to the previous update as the additional update in accordance with the previous update according to the characteristic change confirmed as the proper determination by the post-update determination unit 4102 among the control parameters by the control systems of the systems 7 to 9. Note that specific designation output processing by the parameter designation output unit 4124 of the fourth embodiment is performed according to the parameter designation output unit 3124 of the third embodiment.

Figure 28:
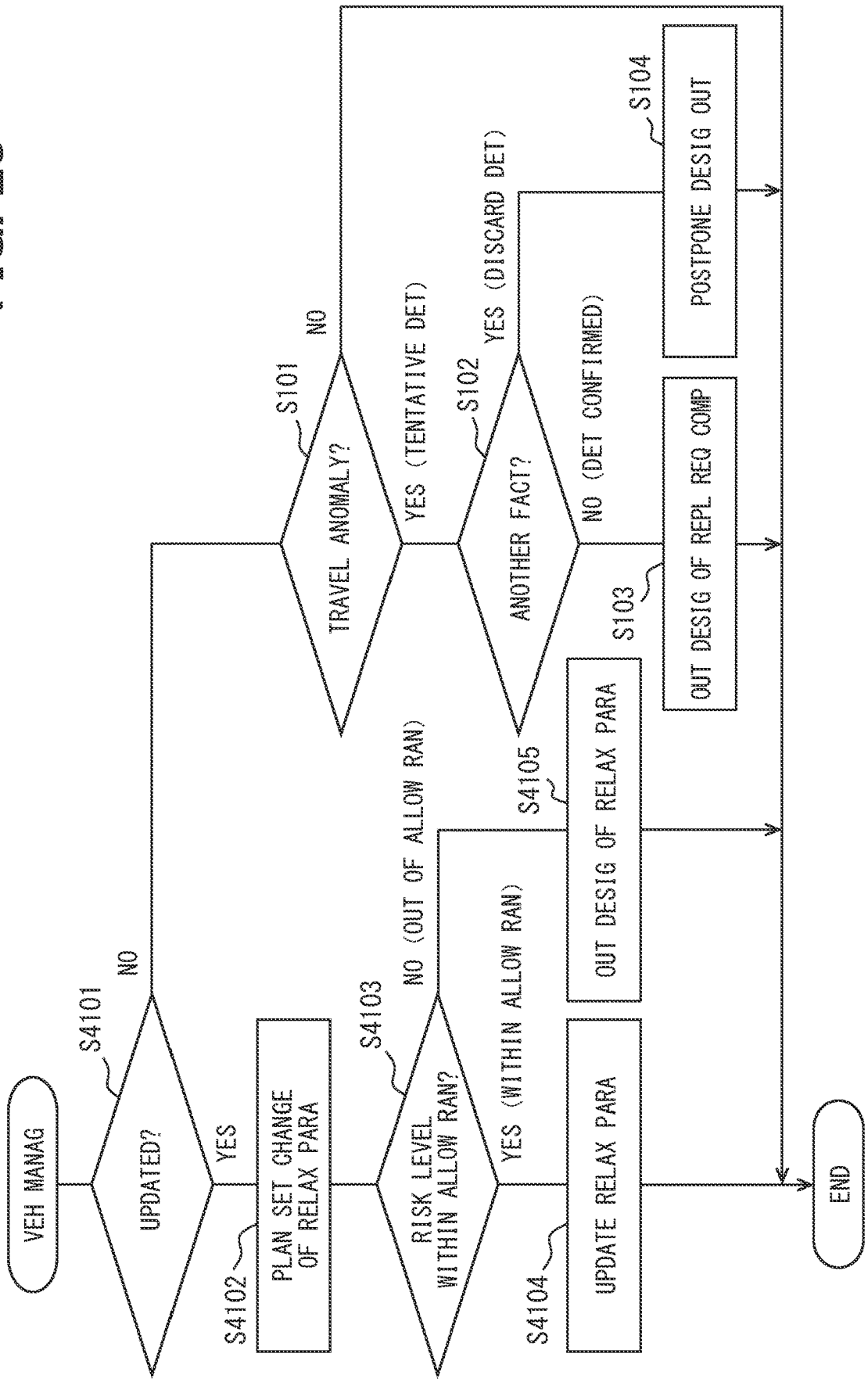
FIG. 28 is a flow chart showing a vehicle management method according to a fourth embodiment.

A flow of a vehicle management method in which the vehicle management device 1 manages the state of the vehicle 2 in cooperation with the function units 4100 and 4120 described above will be described below with reference to FIG. 28. Further, in this flow, "S" means steps of the process executed by instructions included in the vehicle management program.

At S4101, the post-update determination unit 4102 of the estimation determination unit 4100 determines whether or not each of the systems 7 to 9 has been updated as a characteristic change in the basic function system 6 that is estimated to cause the travel fluctuation in the autonomous driving mode of the vehicle 2. As a result, when determination of "NO" is made regarding the update, the flow shifts to S101. Accordingly, S101 and subsequent S102 are executed by the anomaly determination unit 3101 of the estimation determination unit 4100 according to the anomaly determination unit 100 of the first embodiment. Furthermore, S103 and S104 branched from S102 are executed by the component designation output unit 3121 of the update processing unit 4120 according to the designation output unit 120 of the first embodiment.

If it is determined in S4101 that there is an update, the flow proceeds to S4102. At S4102, the risk determination unit 4122 performs plans to change the setting of the relaxation parameter necessary for relaxing the travel fluctuation that is estimated to occur according to the previous update, as the additional updating according to the previous update confirmed as the proper determination at S4101, among the control parameters of the control systems of the systems 7 to 9. At subsequent S4103, the risk determination unit 4122 determines whether or not the risk level due to the planned setting change of the relaxation parameter is within the allowable range.

If it is determined in S4103 that the risk level is within the allowable range, the flow proceeds to S4104. In S4104, the parameter setting change unit 4123 updates the relaxation parameter for which the setting change is planned in S4102. If it is determined in S4103 that the risk level is out of the allowable range, the flow proceeds to S4105. In S4105, the parameter designation output unit 4124 designates and outputs the relaxation parameter whose setting change is planned in S4102.

(Operation Effects)

The operation and effect of the fourth embodiment described above will be described below.

According to the fourth embodiment, in the autonomous driving mode of the vehicle 2, the presence or absence of the characteristic state change estimated to provide the travelling fluctuation of the basic function system 6, which includes the driving system 7, the braking system 8, and the steering system 9, is determined. Therefore, in the fourth embodiment, the vehicle 2 is provided with the relaxation process for relaxing the travelling fluctuation by updating the basic function system 6 in accordance with the determined characteristic change. According to this, in an autonomous driving mode in which the target followability is required, even if the characteristic change of the basic function system 6 that affects the target followability occurs, the relaxation process is performed to resolve the travelling fluctuation relating to the characteristic change. Therefore, it is possible to appropriately manage the vehicle state in order to ensure target followability.

According to the fourth embodiment, it is determined whether there is a change in the characteristic of the basic function system 6 that is estimated to cause the travel fluctuation in the autonomous driving mode of the vehicle 2 after the replacement request component is actually replaced. Therefore, in the fourth embodiment, the vehicle 2 is provided with the relaxation processing for relaxing the travel fluctuation by additionally updating the basic function system 6 in accordance with the characteristic change determined after the replacement. According to this, in an autonomous driving mode in which the target followability is required, even if the characteristic change of the basic function system 6 that affects the target followability occurs and is caused by the actual replacement of the replacement request component, the relaxation process is performed to resolve the travelling fluctuation relating to the characteristic change. Therefore, it is possible to appropriately manage the vehicle state in order to ensure target followability.

According to the fourth embodiment, it is determined whether or not there is a change in the characteristic of the basic function system 6 that is estimated to cause the travel fluctuation in the autonomous driving mode of the vehicle 2 after the setting of the relaxation parameter is changed. Therefore, in the fourth embodiment, the vehicle 2 is provided with the relaxation processing for relaxing the travel fluctuation by additionally updating the basic function system 6 in accordance with the characteristic change determined after the setting change. According to this, in an autonomous driving mode in which the target followability is required, even if the characteristic change of the basic function system 6 that affects the target followability occurs and is caused by the setting change of the relaxation parameter, the relaxation process is performed to resolve the travelling fluctuation relating to the characteristic change. Therefore, it is possible to appropriately manage the vehicle state in order to ensure target followability.

According to the relaxation process of the fourth embodiment, among the control parameters for controlling the driving of the vehicle 2 by the basic function system 6, the relaxation parameter requested to be updated by the setting change is designated and it's information is output to relax the travel fluctuation estimated to be caused by the characteristic change determined for the basic function system 6. According to this, even if the change in the characteristic of the basic function system 6 that affect the target followability occurs in the autonomous driving mode, the relaxation parameter for resolving the travel fluctuation relating to the characteristic change is notified by the designation and output. Therefore, it is possible to appropriately manage the vehicle state in order to ensure target followability.

According to the relaxation process of the fourth embodiment, among the control parameters for controlling the driving of the vehicle 2 by the basic function system 6, the relaxation parameter is updated by the setting change to relax the travel fluctuation estimated to be caused by the characteristic change determined for the basic function system 6. According to this, even if the change in the characteristic of the basic function system that affect the target followability occurs in the autonomous driving mode, the relaxation parameter can be changed so as to resolve the travel fluctuation relating to the characteristic change. Therefore, it is possible to appropriately manage the vehicle state in order to ensure target followability.

According to the relaxation process of the fourth embodiment, the risk level due to the relaxation parameter setting change for relaxing the travel fluctuation is determined. Therefore, when the determined risk level is within the allowable range, the relaxation parameter is updated by changing the setting, and when the risk level is out of the allowable range, the relaxation parameter that is required to be updated by changing the setting is designated and output. According to this, even when the change in the characteristic of the basic function system 6 that affect the target followability in the autonomous driving mode occurs, according to the risk level due to the setting change of the relaxation parameter that resolves the travel fluctuation relating to the characteristic change, the setting change and the designation and output can be switched. Therefore, it is possible to appropriately manage the vehicle state in order to ensure target followability.

According to the fourth embodiment, the setting of the relaxation parameter may be changed according to the learning result based on the driving result of the vehicle 2. According to this, even if the change in the characteristic of the basic function system 6 that affect the target followability occurs in the autonomous driving mode, the relaxation parameter can be changed so as to resolve the travel fluctuation relating to the characteristic change according to the learning. Therefore, it is possible to appropriately manage the vehicle state in order to ensure target followability.

Other Embodiments

Although multiple embodiments have been described above, the present disclosure is not construed as being limited to those embodiments, and can be applied to various embodiments and combinations within a scope that does not depart from the spirit of the present disclosure.

The dedicated computer of the vehicle management device 1 of the modification example may include at least one of a digital circuit and an analog circuit as a processor. In particular, the digital circuit is at least one type of, for example, an ASIC (Application Specific Integrated Circuit), a FPGA (Field Programmable Gate Array), an SOC (System on a Chip), a PGA (Programmable Gate Array), a CPLD (Complex Programmable Logic Device), and the like. Such a digital circuit may include a memory in which a program is stored.

In the modified example, the dedicated computer that constitutes the vehicle management device 1 may be an external computer that is installed in at least one location such as a maintenance shop, a dealer, a remote support center, and the like, and is capable of wireless communication with the vehicle 2. Also, in this case, the designation output units 120 and 3121 in S103 may realize the designation and output of the component X by transmitting the replacement information I related to the designated replacement request component X to such an external computer by wireless communication.

In a modified example, the anomaly determination units 100 and 3101 may confirm the determination that there is a travel anomaly based on the focused difference in S101 by not executing the estimation of another factor in S102. Also, in this case, the anomaly determination units 100 and 3101 in S101 may use, for example, values in multiple stages a to d as shown in FIG. 29 as threshold values for determining the focused difference.

Figure 29:
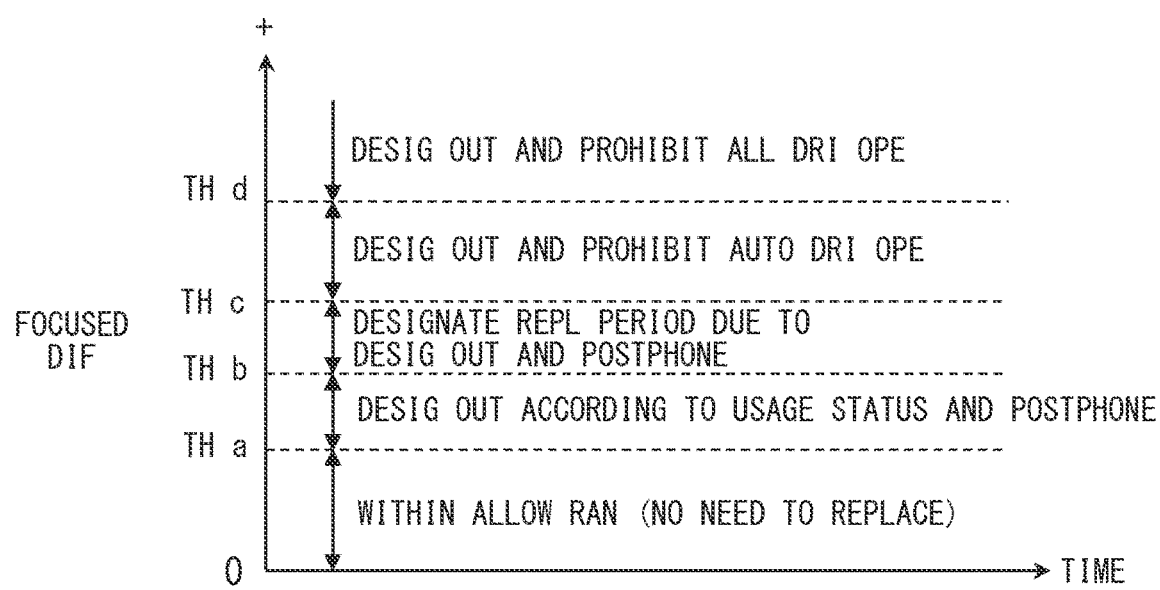
FIG. 29 is a schematic diagram showing modifications of the first to fourth embodiments.

Here, in the example of FIG. 29, when the focused difference is equal to or smaller than the threshold b or smaller than the threshold b in the outside range of the allowable range which is equal to or smaller than the threshold a or smaller than the threshold a, one of the designation output in S103 and the postponement in S104 is performed according to the usage situation. In the example of FIG. 29, when the focused difference is equal to or smaller than the threshold c or smaller than the threshold c in the outside range of the allowable range which is equal to or smaller than the thresholds a and b or smaller than the thresholds a and b, the designation of the replacement period in accordance with the designation and output in S103 is executed together with the postponement in S104. Furthermore, in the example of FIG. 29, when the focused difference is equal to or smaller than the threshold d or smaller than the threshold d in the outside range of the allowable range which is equal to or smaller than the thresholds a, b and c or smaller than the thresholds a, b and c, the designation output in S103 is executed together with the prohibition control of the autonomous driving mode.

Note that in FIG. 29, in addition to the autonomous driving mode, as an example of the case where the manual driving mode is also assumed for the driving control, the designation output in S103 is executed together with the prohibition control of all driving mode in the outside of the allowable range where the focused difference exceeds all thresholds or is equal to or more than all thresholds. Therefore, in the vehicle 2 in which only the autonomous driving mode is realized, this execution is substantially unnecessary.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A vehicle management device that manages a state of a vehicle on which a driving system for providing acceleration, a braking system for providing deceleration, and a steering system for providing steering are mounted as a basic function system, the vehicle management device comprising:
an anomaly determination unit configured to determine whether the vehicle has a travelling anomaly that is estimated to be related to a characteristic change of the basic function system in a management target scene of travelling scenes of the vehicle in which a travelling direction changes when the vehicle travels in an autonomous driving mode; and
a designation output unit configured to designate and output a replacement request of a component that is requested to be replaced according to a determined travelling anomaly from among a plurality of components constituting the basic function system,
wherein
the anomaly determination unit determines a trajectory following anomaly, in which a difference between a target trajectory and an actual traveling position of the vehicle deviates from an allowable range, as the travelling anomaly, and
when the difference deviates from the allowable range, and the travelling anomaly is estimated to be related to an other factor other than the characteristic change, the designation output unit postpones designation and output of the replacement request of the component, and
wherein
the vehicle management device manages the state of the vehicle using the driving system, the braking system and the steering system to ensure target followability for controlling the vehicle in an autonomous driving mode to follow a target based on an actual travelling position of the vehicle.

2. The vehicle management device according to claim 1, wherein:
the other factor includes at least one of:
a transit factor of a distance or time traveled by the vehicle;
a transient disturbance factor in the vehicle;
a structural factor of a road on which the vehicle travels;
a generation factor of a target parameter in the vehicle; and
a status factor of a sensor system mounted on the vehicle.

3. The vehicle management device according to claim 1, wherein:
the designation output unit generates replacement information to be displayed in relation to the replacement request of the component.

4. The vehicle management device according to claim 1, wherein:
the management target scene includes a travelling scene of the vehicle in which the travelling direction after changing is inclined at an angle of 45 degrees or more with respect to the travelling direction before changing.

5. The vehicle management device according to claim 1, wherein:
the management target scene includes a travelling scene of the vehicle in which a numerical number of lanes in the travelling direction after changing is two or more.

6. The vehicle management device according to claim 1, further comprising:
a learning unit configured to learn a control parameter for controlling a driving of the vehicle in the management target scene based on a result of the driving.

7. The vehicle management device according to claim 1, further comprising:
one or more processors, wherein:
the one or more processors provide at least one of the anomaly determination unit; and the designation output unit.

8. A vehicle management device that manages a state of a vehicle on which a driving system for providing acceleration, a braking system for providing deceleration, and a steering system for providing steering are mounted as a basic function system, the vehicle management device comprising:
an anomaly determination unit configured to determine whether the vehicle has a travelling anomaly that is estimated to be related to a characteristic change of the basic function system in a management target scene of travelling scenes of the vehicle in which a travelling direction changes when the vehicle travels in an autonomous driving mode; and
a designation output unit configured to designate and output a replacement request of a component that is requested to be replaced according to a determined travelling anomaly from among a plurality of components constituting the basic function system,
the anomaly determination unit determines, as the travelling anomaly, a speed following anomaly in which a difference between a target speed and an actual travelling speed of the vehicle deviates from an allowable range,
when the difference deviates from the allowable range, and the travelling anomaly is estimated to be related to an other factor other than the characteristic change, the designation output unit postpones designation and output of the replacement request of the component, and
wherein
the vehicle management device manages the state of the vehicle using the driving system, the braking system and the steering system to ensure target followability for controlling the vehicle in an autonomous driving mode to follow a target based on an actual travelling position of the vehicle.

9. The vehicle management device according to claim 8, wherein:
the anomaly determination unit determines a trajectory following anomaly, in which a difference between a target trajectory and an actual traveling position of the vehicle deviates from an allowable range, as the travelling anomaly.

10. A vehicle management method for managing a state of a vehicle on which a driving system for providing acceleration, a braking system for providing deceleration, and a steering system for providing steering are mounted as a basic function system, the vehicle management method comprising:
determining whether the vehicle has a travelling anomaly that is estimated to be related to a characteristic change of the basic function system in a management target scene of travelling scenes of the vehicle in which a travelling direction changes when the vehicle travels in an autonomous driving mode; and
designating and outputting a replacement request of a component that is requested to be replaced according to a determined travelling anomaly from among a plurality of components constituting the basic function system;

determining a trajectory following anomaly is determined, in which a difference between a target trajectory and an actual traveling position of the vehicle deviates from an allowable range, as the travelling anomaly; and when the difference deviates from the allowable range, and the travelling anomaly is estimated to be related to an other factor other than the characteristic change, postponing designation and output of the replacement request of the component, wherein the vehicle management method manages the state of the vehicle using the driving system, the braking system and the steering system to ensure target followability for controlling the vehicle in an autonomous driving mode to follow a target based on an actual travelling position of the vehicle.

11. A vehicle management device that manages a state of a vehicle on which a driving system for providing acceleration, a braking system for providing deceleration, and a steering system for providing steering are mounted as a basic function system, the vehicle management device comprising a processor, wherein:

the processor is configured to execute:

determining whether a travelling fluctuation exists that is estimated to be related to a characteristic change of the basic function system in an autonomous driving mode of the vehicle; and providing a relaxation process to the vehicle to relax the travelling fluctuation by updating the basic function system in accordance with a determined travelling fluctuation, wherein the providing of the relaxation process includes:

designating and outputting a relaxation parameter, for requesting the updating by changing a setting of the relaxation parameter for relaxing the travelling fluctuation, among a plurality of control parameters for controlling a driving of the vehicle in the basic function system;

updating by changing a setting of a relaxation parameter for relaxing the travelling fluctuation, among the plurality of control parameters for controlling the driving of the vehicle in the basic function system;

determining a risk level caused by changing the setting of the relaxation parameter;

updating by changing the setting of the relaxation parameter when a determined risk level is within an allowable range; and designating and outputting the relaxation parameter for requesting the updating by changing the setting of the relaxation parameter when the determined risk level is out of the allowable range, wherein the vehicle management device manages the state of the vehicle using the driving system, the braking system and the steering system to ensure target followability for controlling the vehicle in an autonomous driving mode to follow a target based on an actual travelling position of the vehicle.

12. The vehicle management device according to claim 11, wherein:

the providing of the relaxation process includes designating and outputting a replacement request of a component, among a plurality of components constituting the basic function system, which is requested to be replaced for relaxing the travelling fluctuation.

13. The vehicle management device according to claim 12, wherein:

the processor is further configured to execute:

determining whether the characteristic change of the basic function system exists that is estimated to cause the travelling fluctuation in the autonomous driving mode of the vehicle after replacing the replacement request of the component; and the providing of the relaxation process includes:

providing the vehicle with the relaxation process for relaxing the travelling fluctuation by additionally updating the basic function system in accordance with the characteristic change determined after replacing the replacement request of the component.

14. A vehicle management device that manages a state of a vehicle on which a driving system for providing acceleration, a braking system for providing deceleration, and a steering system for providing steering are mounted as a basic function system, the vehicle management device comprising a processor, wherein:

the processor is configured to execute:

determining whether a characteristic change of the basic function system exists that is estimated to cause a travelling fluctuation in an autonomous driving mode of the vehicle; and providing a relaxation process to the vehicle to relax the travelling fluctuation by updating the basic function system in accordance with a determined characteristic change, wherein the providing of the relaxation process includes:

designating and outputting a relaxation parameter, for requesting the updating by changing a setting of the relaxation parameter for relaxing the travelling fluctuation, among a plurality of control parameters for controlling a driving of the vehicle in the basic function system;

updating by changing a setting of a relaxation parameter for relaxing the travelling fluctuation, among the plurality of control parameters for controlling the driving of the vehicle in the basic function system;

determining a risk level caused by changing the setting of the relaxation parameter;

updating by changing the setting of the relaxation parameter when a determined risk level is within an allowable range; and designating and outputting the relaxation parameter for requesting the updating by changing the setting of the relaxation parameter when the determined risk level is out of the allowable range, wherein the vehicle management device manages the state of the vehicle using the driving system, the braking system and the steering system to ensure target followability for controlling the vehicle in an autonomous driving mode to follow a target based on an actual travelling position of the vehicle.

15. The vehicle management device according to claim 14, wherein:

the updating of the relaxation parameter includes:

changing the setting of the relaxation parameter according to a learning result based on a driving result of the vehicle.

16. The vehicle management device according to claim 14, wherein:

the determining of whether the characteristic change exists includes:
determining whether the characteristic change exists after changing the setting of the relaxation parameter; and
the providing of the relaxation process includes:
providing the vehicle with the relaxation process for relaxing the travelling fluctuation by additionally updating the basic function system in accordance with the characteristic change determined after changing the setting of the relaxation parameter.

17. A vehicle management method executed by a processor for managing a state of a vehicle on which a driving system for providing acceleration, a braking system for providing deceleration, and a steering system for providing steering are mounted as a basic function system, the vehicle management method comprising:
determining whether a travelling fluctuation exists that is estimated to be related to a characteristic change of the basic function system in an autonomous driving mode of the vehicle; and
providing the vehicle with a relaxation process for relaxing the travelling fluctuation by updating the basic function system in accordance with a determined travelling fluctuation, wherein
providing the vehicle with the relaxation process includes:
designating and outputting a relaxation parameter, for requesting the updating by changing a setting of the relaxation parameter for relaxing the travelling fluctuation, among a plurality of control parameters for controlling a driving of the vehicle in the basic function system;
updating by changing a setting of a relaxation parameter for relaxing the travelling fluctuation, among the plurality of control parameters for controlling the driving of the vehicle in the basic function system;
determining a risk level caused by changing the setting of the relaxation parameter;
updating by changing the setting of the relaxation parameter when a determined risk level is within an allowable range; and
designating and outputting the relaxation parameter for requesting the updating by changing the setting of the relaxation parameter when the determined risk level is out of the allowable range,
wherein
the vehicle management method manages the state of the vehicle using the driving system, the braking system and the steering system to ensure target followability for controlling the vehicle in an autonomous driving mode to follow a target based on an actual travelling position of the vehicle.

18. A vehicle management method executed by a processor for managing a state of a vehicle on which a driving system for providing acceleration, a braking system for providing deceleration, and a steering system for providing steering are mounted as a basic function system, the vehicle management method comprising:
determining whether a characteristic change of the basic function system exists that is estimated to cause a travelling fluctuation in an autonomous driving mode of the vehicle; and
providing the vehicle with a relaxation process for relaxing the travelling fluctuation by updating the basic function system in accordance with a determined characteristic change, wherein
providing the vehicle with the relaxation process includes:
designating and outputting a relaxation parameter, for requesting the updating by changing a setting of the relaxation parameter for relaxing the travelling fluctuation, among a plurality of control parameters for controlling a driving of the vehicle in the basic function system;
updating by changing a setting of a relaxation parameter for relaxing the travelling fluctuation, among the plurality of control parameters for controlling the driving of the vehicle in the basic function system;
determining a risk level caused by changing the setting of the relaxation parameter;
updating by changing the setting of the relaxation parameter when a determined risk level is within an allowable range; and
designating and outputting the relaxation parameter for requesting the updating by changing the setting of the relaxation parameter when the determined risk level is out of the allowable range,
wherein
the vehicle management method manages the state of the vehicle using the driving system, the braking system and the steering system to ensure target followability for controlling the vehicle in an autonomous driving mode to follow a target based on an actual travelling position of the vehicle.

19. A vehicle management method for managing a state of a vehicle on which a driving system for providing acceleration, a braking system for providing deceleration, and a steering system for providing steering are mounted as a basic function system, the vehicle management method comprising:
determining whether the vehicle has a travelling anomaly that is estimated to be related to a characteristic change of the basic function system in a management target scene of travelling scenes of the vehicle in which a travelling direction changes when the vehicle travels in an autonomous driving mode;
designating and outputting a replacement request of a component that is requested to be replaced according to a determined travelling anomaly from among a plurality of components constituting the basic function system;
determining, as the travelling anomaly, a speed following anomaly in which a difference between a target speed and an actual travelling speed of the vehicle deviates from an allowable range, when the difference deviates from the allowable range, and the travelling anomaly is estimated to be related to an other factor other than the characteristic change, designation and output of the replacement request of the component is postponed; and
managing the state of the vehicle using the driving system, the braking system and the steering system to ensure target followability for controlling the vehicle in an autonomous driving mode to follow a target based on an actual travelling position of the vehicle,
wherein
the vehicle management method manages the state of the vehicle using the driving system, the braking system and the steering system to ensure target followability for controlling the vehicle in an autonomous driving mode to follow a target based on an actual travelling position of the vehicle.

* * * * *